US011465095B2

(12) United States Patent
Koizumi et al.

(10) Patent No.: US 11,465,095 B2
(45) Date of Patent: Oct. 11, 2022

(54) VENTILATION SYSTEM

(71) Applicant: DAIKIN INDUSTRIES, LTD., Osaka (JP)

(72) Inventors: Shin Koizumi, Osaka (JP); Toshio Tanaka, Osaka (JP); Shunji Haruna, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 506 days.

(21) Appl. No.: 16/618,008

(22) PCT Filed: Jun. 1, 2018

(86) PCT No.: PCT/JP2018/021273
§ 371 (c)(1),
(2) Date: Nov. 27, 2019

(87) PCT Pub. No.: WO2018/221740
PCT Pub. Date: Dec. 6, 2018

(65) Prior Publication Data
US 2020/0179867 A1 Jun. 11, 2020

(30) Foreign Application Priority Data

Jun. 2, 2017 (JP) .............................. JP2017-110136

(51) Int. Cl.
*B01D 53/22* (2006.01)
*B01D 53/26* (2006.01)
(Continued)

(52) U.S. Cl.
CPC ............. *B01D 53/22* (2013.01); *B01D 53/26* (2013.01); *B01D 53/30* (2013.01); *F24F 6/00* (2013.01);
(Continued)

(58) Field of Classification Search
CPC ........ B01D 53/22; B01D 53/26; B01D 53/30; B01D 2053/221; F24F 6/00; F24F 7/00;
(Continued)

(56) References Cited

U.S. PATENT DOCUMENTS

2006/0150644 A1* 7/2006 Wruck ..................... F24F 11/74
62/126
2010/0326121 A1 12/2010 Ishida et al.
(Continued)

FOREIGN PATENT DOCUMENTS

CN 103717978 A 4/2014
JP 2006-275487 A 10/2006
(Continued)

OTHER PUBLICATIONS

European Search Report of corresponding EP Application No. 18 80 9173.0 dated Dec. 23, 2020.
(Continued)

*Primary Examiner* — Emmanuel E Duke
(74) *Attorney, Agent, or Firm* — Global IP Counselors, LLP

(57) ABSTRACT

A ventilation system includes an inside air passage having inflow and outflow ends communicating with an indoor space to be ventilated, at least one permeable film unit including a permeable film, and an air supply passage having an inflow end communicating with an outdoor space and an outflow end connected to a downstream side of the permeable film in the inside air passage. The permeable film allows a target gas to pass and allows the target gas that has passed through the permeable film to be discharged into outdoor air. The target gas contains at least one of carbon dioxide and a volatile organic compound in indoor air that flows in the inside air passage. Alternatively or in addition, the ventilation system can include an outside air passage and a dis-
(Continued)

charge passage in place of or in addition to the inside air passage and the air supply passage, respectively.

16 Claims, 10 Drawing Sheets

(51) Int. Cl.
| | | |
|---|---|---|
| *B01D 53/30* | (2006.01) | |
| *F24F 6/00* | (2006.01) | |
| *F24F 7/00* | (2021.01) | |
| *F24F 7/007* | (2006.01) | |
| *F24F 11/00* | (2018.01) | |
| *F24F 110/70* | (2018.01) | |
| *F24F 110/66* | (2018.01) | |

(52) U.S. Cl.
CPC ............... *F24F 7/00* (2013.01); *F24F 7/007* (2013.01); *F24F 11/0001* (2013.01); *B01D 2053/221* (2013.01); *F24F 2110/66* (2018.01); *F24F 2110/70* (2018.01)

(58) Field of Classification Search
CPC ...... F24F 7/007; F24F 7/08; F24F 7/06; F24F 11/0001; F24F 2110/66; F24F 2110/70; F24F 8/10; F24F 8/15; F24F 8/158; F24F 6/04; F24F 6/06; F24F 2007/0025; F24F 2007/001; F24F 2203/1024; F24F 2203/1032; Y02B 30/70

See application file for complete search history.

(56) References Cited

U.S. PATENT DOCUMENTS

| | | |
|---|---|---|
| 2012/0003916 A1 | 1/2012 | Iwase et al. |
| 2014/0165838 A1 | 6/2014 | Suzuki et al. |

FOREIGN PATENT DOCUMENTS

| | | | | |
|---|---|---|---|---|
| JP | 2006275487 A | * | 10/2006 | ............. Y02A 50/20 |
| JP | 2011-012114 A | | 1/2011 | |
| JP | 2012011878 A | | 1/2012 | |
| JP | 2012032138 A | | 2/2012 | |
| WO | WO-2014123044 A1 | * | 8/2014 | .......... F24F 11/0079 |

OTHER PUBLICATIONS

International Search Report of corresponding PCT Application No. PCT/JP2018/021273 dated Aug. 28, 2018.
International Preliminary Report of corresponding PCT Application No. PCT/JP2018/021273 dated Dec. 12, 2019.

* cited by examiner

VENTILATION SYSTEM

CROSS-REFERENCE TO RELATED APPLICATIONS

This U.S. National stage application claims priority under 35 U.S.C. § 119(a) to Japanese Patent Application No. 2017-110136, filed in Japan on Jun. 2, 2017, the entire contents of which are hereby incorporated herein by reference.

BACKGROUND

Field of the Invention

The present invention relates to a ventilation system.

Background Information

Conventionally, a ventilation system that ventilates the interior of a room is known. As a ventilation system of this type, Japanese Unexamined Patent Application Publication No. 2006-275487 discloses a ventilation system that removes carbon dioxide while causing indoor air to circulate.

As shown in FIG. 2 of this document, the ventilation system includes an inside air passage into which indoor air in an indoor space to be ventilated is introduced and that allows the indoor air to recirculate into the indoor space. A carbon-dioxide removing device is provided in the inside air passage. The carbon-dioxide removing device contains a chemical agent (such as a liquid amine type, a solid amine type, or activated carbon) for absorbing or adsorbing a target gas. When the indoor air passes through the carbon-dioxide removing device, the carbon dioxide in the indoor air is absorbed or adsorbed by the chemical agent, and is removed. This makes it possible to reduce the concentration of carbon dioxide in the indoor air in the indoor space and thus to reduce the ventilation amount of the indoor space.

CITATION LIST

Patent Literature

PTL 1: Japanese Unexamined Patent Application Publication No, 2006-275487

SUMMARY OF INVENTION

Technical Problem

The ventilation system in Japanese Unexamined Patent Application Publication No. 2006-275487 uses a chemical agent for removing the target gas. Therefore, when an attempt is made to continuously remove the carbon dioxide in the indoor air by the chemical agent, the absorption capability or the adsorption capability of the chemical agent is quickly reduced. As a result, it is necessary to exchange the chemical agent or to restore the capability of the chemical agent, as a result of which running costs and initial costs are increased.

The present invention is made in view of such problems, and its object is to provide a ventilation system that is capable of removing a target gas in indoor air over a long period of time while reducing costs.

Solution to Problem

A ventilation system according to a first aspect is a ventilation system comprising an inside air passage (P1) that has an inflow end and an outflow end that each communicate with an indoor space (R) to be ventilated; at least one permeable film unit (30) that includes a permeable film (35) which allows a target gas to pass therethrough and which allows the target gas that has passed through the permeable film (35) to be discharged into outdoor air, the target gas containing at least one of carbon dioxide and a volatile organic compound in indoor air that flows in the inside air passage (P1); and an air supply passage (P3) that has an inflow end which communicates with an outdoor space (O) and an outflow end which is connected to a downstream side of the permeable film (35) in the inside air passage (P1).

In the first aspect, the indoor air in the indoor space (R) to be ventilated is introduced into the inside air passage (P1) by an inside air fan (21). In the permeable film unit (30), the target gas (such as carbon dioxide or a volatile organic compound) moves between the indoor air that flows in the inside air passage (P1) and the outdoor air. Specifically, the concentration of target gas in the indoor air in the indoor space (R) is higher than the concentration of target gas in the outdoor air in the outdoor space (O). This is because due to the influence of people or other objects existing in the indoor space (R), the concentration of carbon dioxide or the concentration of volatile organic compound in the indoor air is increased. Therefore, in the permeable film unit (30), the difference between the partial pressure of target gas in the indoor air and the partial pressure of target gas in the outdoor air (partial pressure difference) causes the target gas to selectively pass through the permeable film (35). That is, the target gas in the indoor air in the inside air passage (P1) is discharged to the outdoor air after passing through the permeable film (35).

Therefore, the amount of target gas in the indoor air that flows in the inside air passage (P1) is reduced. The indoor air in which concentration of target gas has been reduced is supplied again into the indoor space (R) from the inside air passage (P1). This makes it possible to reduce the concentration of target gas in the indoor air in the indoor space (R) and thus to reduce the ventilation amount of the indoor space (R). Consequently, it is possible to suppress an increase in the air-conditioning load in the indoor space (R) caused by the ventilation from occurring and to increase energy conservation.

Since the permeable film unit (30) uses the partial pressure difference between the target gas in the indoor air and the target gas in the outdoor air, unlike the carbon dioxide device disclosed in Japanese Unexamined Patent Application Publication No. 2006-275487, reduction in the adsorption capability or the absorption capability of a chemical agent caused by continued use does not occur. Therefore, the present invention makes it possible to continuously remove the target gas in the indoor air without increasing running costs and initial costs.

The indoor air in which the concentration of target gas is relatively high is continuously supplied to the permeable film unit (30). Therefore, it is possible to reliably ensure the partial pressure difference between the target gas in the indoor air and the target gas in the outdoor air. As a result, it is possible to increase the separation efficiency of the target gases in the permeable film (35).

Since the permeable film (35) is relatively lighter than an absorbent and an adsorbent, the permeable film unit (30) has high layout flexibility.

In the first aspect, it is possible to supply the outdoor air introduced into the air supply passage (P3) into the indoor space (R) via the flow path on the downstream side of the permeable film (35) in the inside air passage (P1). That is, the flow path on the downstream side of the permeable film (35) in the inside air passage (P1) is used both as a flow path for sending the indoor air in which the concentration of target gas has been reduced by the permeable film (35) into the indoor space (R) and as a flow path for sending the outdoor air introduced from the outdoor space (O) into the indoor space (R). Therefore, it is possible to simplify, for example, the duct for forming the flow path and to reduce the cost of the ventilation system.

A ventilation system according to a second aspect is the ventilation system according to the first aspect including an outside air passage (P2) that has an inflow end and an outflow end that each communicate with the outdoor space (O), wherein the permeable film (35) is provided so as to separate the inside air passage (P1) and the outside air passage (P2) from each other.

In the second aspect, the outdoor air in the outdoor space (O) is introduced into the outside air passage (P2). In the permeable film unit (30), the difference between the partial pressure of target gas in the indoor air that flows in the inside air passage (P1) and the partial pressure of target gas in the outdoor air that flows in the outside air passage (P2) causes the target gases to selectively pass through the permeable film (35). That is, after the target gas in the indoor air that flows in the inside air passage (P1) has passed through the permeable film (35), the target gas is discharged into the outdoor air that flows in the outside air passage (P2). The indoor air in which the concentration of target gas has been reduced in the inside air passage (P1) is supplied again into the indoor space (R) from the inside air passage (P1). The outdoor air in which the concentration of target gas has been increased in the outside air passage (P2) is discharged into the outdoor space (O).

As described above, the indoor air in which the concentration of target gas is relatively high and the indoor air in which the concentration of target gas is relatively low are continuously supplied to the permeable film unit (30). Therefore, it is possible to reliably ensure the partial pressure difference between the target gas in the indoor air and the target gas in the outdoor air. As a result, it is possible to increase the separation efficiency of the target gases in the permeable film (35).

A ventilation system according to a third aspect is the ventilation system according to the second aspect including a discharge passage (P4) that has an inflow end which communicates with the indoor space (R) and an outflow end which is connected to a downstream side of the permeable film (35) in the outside air passage (P2).

In the third aspect, it is possible to discharge the indoor air introduced into the discharge passage (P4) into the outdoor space (O) via the flow path on the downstream side of the permeable film (35) in the outside air passage (P2). That is, the flow path on the downstream side of the permeable film (35) in the outside air passage (P2) is used both as a flow path for discharging the outdoor air containing the target gas discharged from the permeable film (35) into the outdoor space (O) and as a flow path for discharging the indoor air in the indoor space (R) into the outdoor space (O). Therefore, it is possible to simplify, for example, the duct for forming the flow path and to reduce the cost of the ventilation system.

A ventilation system according to a fourth aspect is a ventilation system including an outside air passage (P2) that has an inflow end and an outflow end that each communicate with an outdoor space (O); at least one permeable film unit (30) that includes a permeable film (35) which allows a target gas to pass therethrough and which allows the target gas that has passed through the permeable film (35) to be discharged into outdoor air in the outside air passage (P2), the target gas containing at least one of carbon dioxide and a volatile organic compound in indoor air in an indoor space (R) to be ventilated; and a discharge passage (P4) that has an inflow end which communicates with the indoor space (R) and an outflow end which is connected to a downstream side of the permeable film (35) in the outside air passage (P2).

In the fourth aspect, the outdoor air in the outdoor space (O) is introduced into the outside air passage (P2). In the permeable film unit (30), the difference between the partial pressure of target gas in the indoor air in the indoor space (R) and the partial pressure of target gas in the outdoor air that flows in the outside air passage (P2) causes the target gas to selectively pass through the permeable film (35). That is, after the target gas in the indoor air in the indoor space (R) has passed through the permeable film (35), the target gas is discharged into the outdoor air that flows in the outside air passage (P2).

Therefore, it is possible to reduce the amount of target gas in the indoor air in the indoor space (R) and thus to reduce the ventilation amount of the indoor space (R). Consequently, it is possible to suppress an increase in the air-conditioning load in the indoor space (R) caused by the ventilation from occurring and to increase energy conservation.

Since the permeable film unit (30) makes use of the partial pressure difference between the target gas in the indoor air and the target gas in the outdoor air, unlike the carbon dioxide device disclosed in Patent Literature 1, reduction in the adsorption capability and the absorption capability of a chemical agent caused by continued use does not occur. Therefore, the present invention makes it possible to continuously remove the target gas in the indoor air without increasing running costs and initial costs.

The outdoor air in which the concentration of target gas is relatively low is continuously supplied into the permeable film unit (30). Therefore, it is possible to reliably ensure the partial pressure difference between the target gas in the indoor air and the target gas in the outdoor air. As a result, it is possible to increase the separation efficiency of the target gases in the permeable film (35).

Since the permeable film (35) is relatively lighter than an absorbent and an adsorbent, the permeable film unit (30) has high layout flexibility.

In the fourth aspect, it is possible to discharge the indoor air introduced into the discharge passage (P4) into the outdoor space (O) via the flow path on the downstream side of the permeable film (35) in the outside air passage (P2). That is, the flow path on the downstream side of the permeable film (35) in the outside air passage (P2) is used both as a flow path for discharging the outdoor air containing the target gas discharged from the permeable film (35) into the outdoor space (O) and as a flow path for discharging the indoor air in the indoor space (R) into the outdoor space (O). Therefore, it is possible to simplify, for example, the duct for forming the flow path and to reduce the cost of the ventilation system.

A ventilation system according to a fifth aspect is the ventilation system according to the fourth aspect including an inside air passage (P1) that bras an inflow end and an outflow end that each communicate with the indoor space (R) to be ventilated, wherein the permeable film (35) is provided so as to separate the inside air passage (P1) and the outside air passage (P2) from each other.

In the fifth aspect, the difference between the partial pressure of the indoor air that flows in the inside air passage (P1) and the partial pressure of target gas in the outdoor air that flows in the outside air passage (P2) causes the target gases to selectively pass through the permeable film (35). That is, after the target gas in the indoor air that flows in the inside air passage (P1) has passed through the permeable film (35), the target gas is discharged into the outdoor air that flows in the outside air passage (P2). The indoor air in which the concentration of target gas has been reduced in the inside air passage (P1) is supplied again into the indoor space (R) from the inside air passage (P1). The outdoor air in which the concentration of target gas has been increased in the outside air passage (P2) is discharged into the outdoor space (O).

As described above, in the permeable film unit (30), the indoor air in which the concentration of target gas is relatively high and the indoor air in which the concentration of target gas is relatively low are continuously supplied. Therefore, it is possible to reliably ensure the partial pressure difference between the target gas in the indoor air and the target gas in the outdoor air. As a result, it is possible to increase the separation efficiency of the target gases in the permeable film (35).

A ventilation system according to a sixth aspect is the ventilation system according to any one of the first aspect to the third aspect including an inside air fan (21) that is disposed on a downstream side of a connection portion of the air supply passage (P3) in the inside air passage (P1).

In the sixth aspect, the inside air fan (21) is used both as a fan for sending air that has passed through the permeable film (35) into the indoor space (R) and as a fan for sending outdoor air in the outdoor space (O) into the indoor space (R). Therefore, it is possible to reduce the cost of the ventilation system.

A ventilation system according to a seventh aspect is the ventilation system according to any one of the first aspect, the second aspect, the third aspect, and the sixth aspect, wherein the inside air passage (P1) includes an inside air introducing path (11, 12) on an upstream side of a connection portion of the air supply passage (P3), and an inside air supply path (13) on a downstream side of the connection portion of the air supply passage (P3), and wherein the ventilation system includes an air-supply-side adjusting mechanism (23) that adjusts either one of or both of a flow rate of air that flows in the inside air introducing path (11, 12) and a flow rate of air that flows in the air supply passage (P3).

In the seventh aspect, one or both of the flow rate of air that flows in the inside air introducing path (11, 12) and the flow rate of air that flows in the air supply passage (P3) can be adjusted by the air-supply-side adjusting mechanism (23). When an attempt is made to cause the indoor air to flow into the inside air introducing path (11, 12), the flow rate of indoor air that passes through the permeable film (35) is increased, and the target gas in the indoor air can be discharged into the outdoor air via the permeable film (35). When an attempt is made to cause the outdoor air to flow into the air supply passage (P3), the flow rate of outdoor air that is supplied into the interior of a room is increased, and the concentration of target gas in the indoor space (R) can be quickly reduced.

A ventilation system according to an eighth aspect is the ventilation system according to the seventh aspect, including a concentration detecting section (40) that detects a concentration of a target gas in indoor air in the indoor space (R), and a controlling device (50) that controls the air-supply-side adjusting mechanism (23) based on a detected concentration provided by the concentration detecting section (40).

In the eighth aspect, in accordance with the concentration of target gas in the indoor space (R), it is possible to change the concentration of target gas that is discharged into the outdoor air from the permeable film (35) or to change the amount of outdoor air that is supplied into the indoor space (R).

A ventilation system according to a ninth aspect is the ventilation system according to any one of the third aspect to the fifth aspect including an outside air fan (22) that is disposed on a downstream side of a connection portion of the discharge passage (P4) in the outside air passage (P2).

In the ninth aspect, the outside air fan (22) is used both as a fan for sending air that has passed through the permeable film (35) into the outdoor space (O) and as a fan for sending indoor air in the indoor space (R) into the outdoor space (O). Therefore, it is possible to reduce the cost of the ventilation system.

A ventilation system according to a tenth aspect is the ventilation system according to any one of the third aspect, the fourth aspect, the fifth aspect, and the ninth aspect, wherein the outside air passage (P2) includes an outside air introducing path (14, 16) on an upstream side of a connection portion of the discharge passage (P4) and an outside air discharge path (15) on a downstream side of the connection portion of the discharge passage (P4), and wherein the ventilation system includes a discharge-side adjusting mechanism (24) that adjusts either one of or both of a flow rate of air that flows in the outside air introducing path (14, 16) and a flow rate of air that flows in the discharge passage (P4).

In the tenth aspect, the flow rate of air that flows in the outside air introducing path (14, 16) and the flow rate of air that flows in the discharge passage (P4) can be changed by the discharge-side adjusting mechanism (24). When an attempt is made to cause the outdoor air to flow into the outside air introducing path (14, 16), the flow rate of outdoor air that passes through the permeable film (35) is increased, and the target gas in the indoor air can be discharged into the outdoor air via the permeable film (35). When an attempt is made to cause the indoor air to flow into the discharge passage (P4), the flow rate of indoor air that is discharged out of a room is increased, and the concentration of target gas in the indoor space (R) can be quickly reduced.

A ventilation system according to an eleventh aspect is the ventilation system according to the tenth aspect including a concentration detecting section (40) that detects a concentration of a target gas in indoor air in the indoor space (R), and a controlling device (50) that controls the discharge-side adjusting mechanism (24) based on a detected concentration provided by the concentration detecting section (40).

In the eleventh aspect, in accordance with the concentration of target gas in the indoor space (R), it is possible to change the concentration of target gas that is discharged into the outdoor air from the permeable film (35) or to change the amount of the indoor air that is discharged into the outdoor space (O).

A ventilation system according to a twelfth aspect is the ventilation system according to any one of the first aspect to the eleventh aspect including a plurality of the permeable film units (30) provided in correspondence with a plurality of the indoor spaces (R) to be ventilated.

In the twelfth aspect, in correspondence with the plurality of indoor spaces (R) to be ventilated, a plurality of permeable film units (30) are provided. When one permeable film unit (30) tries to remove target gases in the plurality of target indoor spaces (R), the separation efficiency of the permeable film (35) may be reduced. Specifically, for example, when, in some of the indoor spaces (R), people do not exist and the concentration of carbon dioxide is reduced, carbon dioxide in the indoor air that is treated in the permeable film (35) is diluted and the partial pressure of carbon dioxide may be reduced. In this case, the difference between the partial pressures of carbon dioxide on two respective sides of the permeable film (35) is reduced, and the separation efficiency of carbon dioxide is reduced.

In contrast, in the present aspect, since the permeable film units (30) are provided in correspondence with the plurality of indoor spaces (R), it is possible to prevent such dilution of the target gases from occurring and to ensure the separation efficiency of each permeable film (35).

A ventilation system according to a thirteenth aspect is the ventilation system according to any one of the first aspect to the twelfth aspect including a humidifier (61, 68, 83, 84) for adding moisture to the permeable film (35).

In the thirteenth aspect, by adjusting the humidification capability of the humidifier (61, 68, 83, 84), it is possible to adjust the amount of moisture added to the permeable film (35) and thus adjust the separation capability of the target gas in the permeable film (35).

A ventilation system according to a fourteenth aspect is the ventilation system according to the thirteenth aspect, wherein the humidifier (61, 68, 83, 84) is configured to make a humidification capability adjustable.

In the fourteenth aspect, by adjusting the humidification capability of the humidifier (61, 68, 83, 84), it is possible to adjust the amount of moisture added to the permeable film (35) and thus adjust the separation capability of the target gas in the permeable film (35).

A ventilation system according to a fifteenth aspect is the ventilation system according to the thirteenth aspect or the fourteenth aspect including a dehumidifier (62, 69, 83, 84) that dehumidifies air that flows on a downstream side of the permeable film (35).

In the fifteenth aspect, air that flows on the downstream side of the permeable film (35) can be dehumidified by the dehumidifier (62, 69, 83, 84). When moisture is added to the permeable film (35) by the humidifier (61, 68, 83, 84), the moisture may be supplied to, for example, the indoor space (R) indoor space (R). For example, during the summer season, when such highly humid air is supplied to the indoor space (R), the indoor space (R) becomes less comfortable. In contrast, in the present invention, since it is possible to dehumidify the air that is supplied to, for example, the indoor space (R), it is possible ensure the comfortableness of, for example, the indoor space (R).

A ventilation system according to a sixteenth aspect is the ventilation system according to the fifteenth aspect, wherein the humidifier (61, 68, 83, 84) makes use of moisture removed by the dehumidifier (62, 69, 83, 84)) as humidifying water.

In the sixteenth aspect, the moisture removed by the dehumidifier (62, 69, 83, 84) is used as humidifying water of the humidifier (61, 68, 83, 84). Therefore, it is unnecessary to supply humidifying water to the humidifier (61, 68, 83, 84), or it is possible to reduce the amount of supply water.

Advantageous Effects of Invention

The present invention makes it possible to reduce the concentration of target gas in indoor air by a permeable film (35) by making use of the partial pressure difference between the target gas in the indoor air and target gas in outdoor air. Therefore, it is possible to provide a ventilation system that is capable of removing the target gas in the indoor air over a long period of time while reducing costs.

DETAILED DESCRIPTION OF EMBODIMENT(S)

An embodiment of the present invention is described below with reference to the drawings. The embodiment below is an essentially preferred exemplification and is not intended to limit the present invention, objects to which the present invention is applicable, and the range of use of the present invention.

<Overall Structure of Ventilation System>

Figure 1:
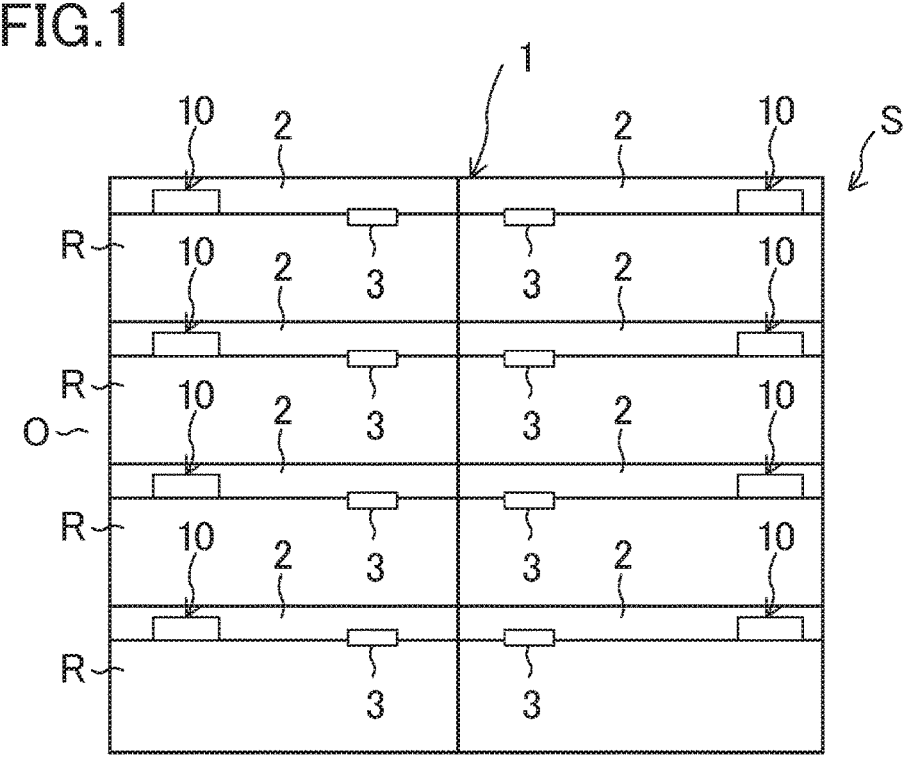
FIG. 1 is a schematic structural view of an entire ventilation system according to an embodiment.

A ventilation system (S) of the present embodiment ventilates, for example, a building. As shown in FIG. 1, a building (1) has a plurality of floors, and each floor is divided into indoor spaces (R) to be ventilated. The ventilation system (S) of the present embodiment includes a plurality of ventilation units 10 corresponding to the plurality of indoor spaces (R). Each ventilation unit (10) is disposed in, for example, its corresponding ceiling space (2) of the building (1). The ventilation system (S) of the present embodiment is formed so as to, in addition to ventilating the indoor spaces (R), remove a target gas (carbon dioxide) in indoor air in each indoor space R.

<Overall Structure of Ventilation Unit>

Figure 2:
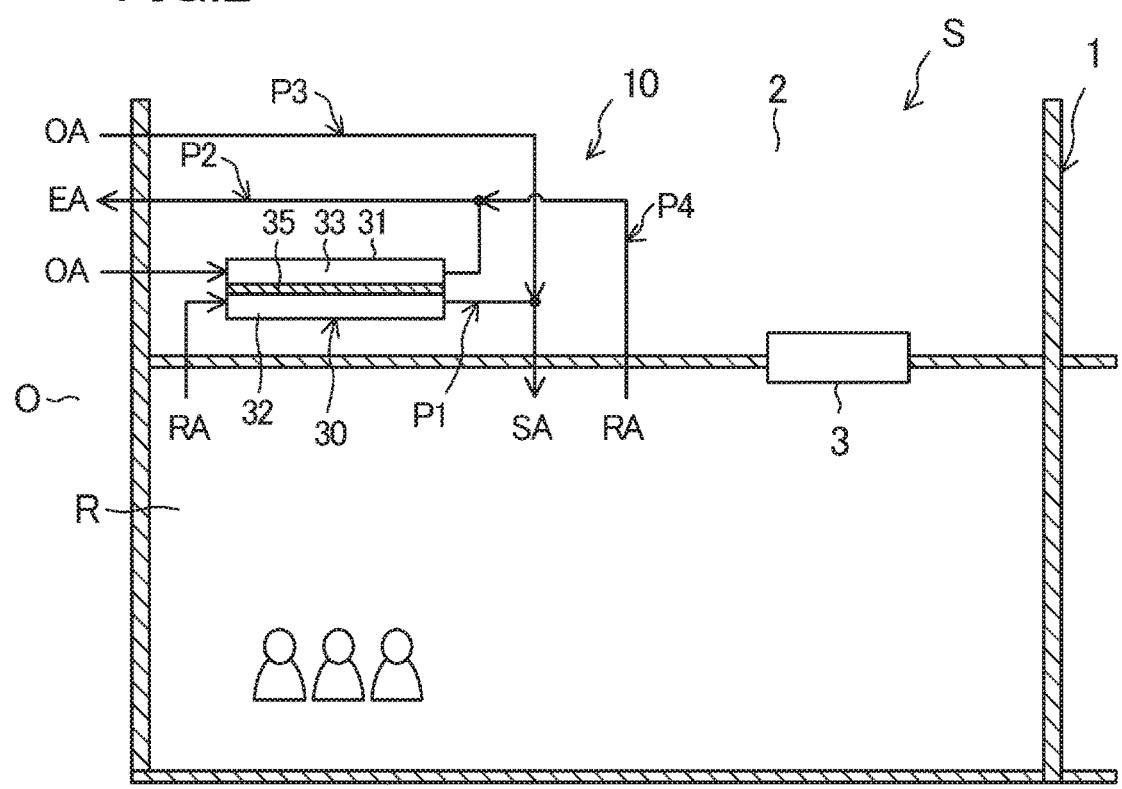
FIG. 2 is a schematic structural view of an entire ventilation unit.

As shown in FIGS. 1 and 2, each ventilation unit (10) is disposed in its ceiling space (2) above the corresponding indoor space (R). In the building (1), a plurality of air conditioners (3) corresponding to the respective indoor spaces (R) are provided. Each air conditioner (3) constitutes an indoor unit facing the corresponding indoor space (R), and cools or warms the corresponding indoor space (R) by switching between cooling and warming.

Figure 3:
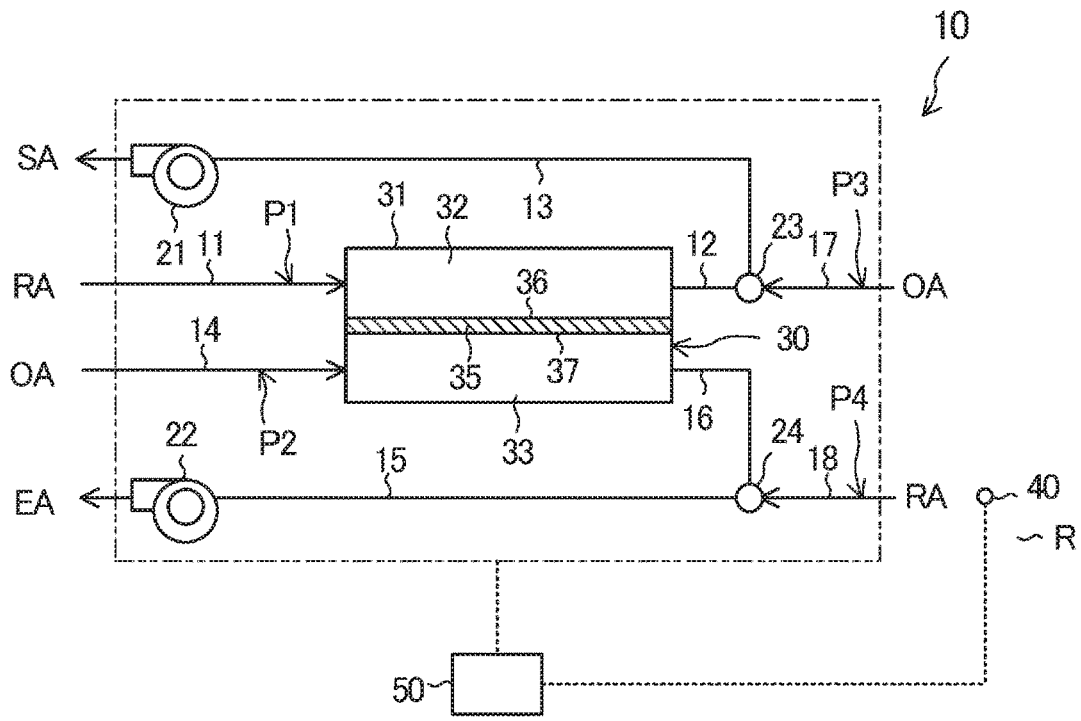
FIG. 3 is a structural view schematically showing the main portion of the ventilation unit.

As shown in FIGS. 2 and 3, a ventilation unit (10) includes a plurality of ducts (11 to 18), an air supply fan (21), a discharge fan (22), an air-supply-side adjusting mechanism (23), a discharge-side adjusting mechanism (24), an air supply fan (21), a discharge fan (22), a permeable film unit (30), a carbon dioxide concentration sensor (40), and a controller (50). The permeable film unit (30) includes a vertically long separation duct (31) and a permeable film (35) that is accommodated in the separation duct (31). The permeable film (35) divides the internal space of the separation duct (31) into a first passage (32) (supply-surface-side passage) and a second passage (33) (permeable-surface-side passage).

<Ducts>

The plurality of ducts include a first inside air duct (11), an inside air relay duct (12), an air supply duct (13), a first outside air duct (14), a discharge duct (15), an outside air relay duct (16), a second outside air duct (17), and a second inside air duct (18).

An inflow end of the first inside air duct (11) communicates with the indoor space (R), and an outflow end of the first inside air duct (11) is connected to the first passage (32) of the separation duct (31). An inflow end of the inside air relay duct (12) is connected to the first passage (32) of the separation duct (31), and an outflow end of the inside air relay duct (12) is connected to an inflow end of the air supply duct (13). An outflow end of the air supply duct (13) communicates with the indoor space (R).

The first inside air duct (11 the first passage (32), the inside air relay duct (12), and the air supply duct (13) are connected to each other in this order, and form an inside air passage P1. The inside air passage (P1) is an inside air circulation flow path in which indoor air (RA) introduced from the indoor space (R) flows and that is used for sending this air as supply air (SA) into the indoor space (R).

An inflow end of the first outside air duct (14) communicates with an outdoor space (O), and an outflow end of the first outside air duct (14) is connected to the second passage (33) of the separation duct (31). An inflow end of the outside air relay duct (16) is connected to the second passage (33) of the separation duct (31), and an outflow end of the outside air relay duct (16) is connected to an inflow end of the discharge duct (15). An outflow end of the discharge duct (15) communicates with the outdoor space (O).

The first outside air duct (14), the second passage (33), the outside air relay duct (16), and the discharge duct (15) are connected to each other in this order, and form an outside air passage (P2). The outside air passage (P2) is an outside air circulation flow path in which outdoor air (OA) introduced from the outdoor space (O) flows and that is used for sending this air as discharge air (EA) into the indoor space (R).

An inflow end of the second outside air duct (17) communicates with the outdoor space (O), and an outflow end of the second outside air duct (17) communicates with the inflow end of the air supply duct (13). That is, the second outside air duct (17) forms an air supply passage (P3) including the inflow end that communicates with the outdoor space (O) and the outflow end that is connected to a downstream side of the permeable film (35) in the inside air passage (P1).

An inflow end of the second inside air duct (18) communicates with the indoor space (R), and an outflow end of the second inside air duct (18) communicates with the discharge duct (15). That is, the second inside air duct (18) forms a discharge passage (P4) including the inflow end that communicates with the indoor space (R) and an outflow end that is connected to a downstream side of the permeable film (35) in the outside air passage (P2).

<Air Supply Fan>

The air supply fan (21) is connected to the air supply duct (13). The air supply fan (21) is used as an inside air fan that causes indoor air in the indoor space (R) to be introduced into the inside air passage (P1) and causes the indoor air to be sent into the indoor space (R) again.

<Discharge Fan>

The discharge fan (22) is connected to the discharge duct (15). The discharge fan (22) is used as an outside air fan that causes outdoor air in the outdoor space (O) to be introduced into the outside air passage (P2) and causes the outdoor air to be sent into the outdoor space (O) again.

<Air-Supply-Side Adjusting Mechanism>

As shown in FIG. 3, the air-supply-side adjusting mechanism (23) is provided at a connection portion where the inside air relay duct (12), the second outside air duct (17), and the air supply duct (13) are connected to each other. The air-supply-side adjusting mechanism (23) is formed so as to be switchable between a first state in which the air supply duct (13) communicates with the second outside air duct (17) and is disconnected from the inside air relay duct (12) and a second state in which the air supply duct (13) communicates with both the second outside air duct (17) and the inside air relay duct (12). The air-supply-side adjusting mechanism (23) is formed from, for example, at least one damper and at least one on-off valve.

<Discharge-Side Adjusting Mechanism>

As shown in FIG. 3, the discharge-side adjusting mechanism (24) is provided at a connection portion where the outside air relay duct (16), the second inside air duct (18), and the discharge duct (15) are connected to each other. The discharge-side adjusting mechanism (24) is formed so as to be switchable between a first state in which the discharge duct (15) communicates with the second inside air duct (18) and is disconnected from the outside air relay duct (16) and a second state in which the discharge duct (15) communicates with both the second inside air duct (18) and the outside air relay duct (16) The air-supply-side adjusting mechanism (23) is formed from, for example, at least one damper and at least one on-off valve.

<Permeable Film Unit>

The permeable film unit (30) of the present embodiment is formed so that, with carbon dioxide in the indoor air in the indoor space (R) being a target gas, the carbon dioxide in the indoor air is removed. That is, the permeable film (35) of the permeable film unit (30) is formed so that at least the carbon dioxide in the indoor air selectively passes through the permeable film (35).

The separation duct (31) of the permeable film unit (30) has a vertically long hollow cylindrical shape, or a vertical long hollow rectangular shape. The permeable film (35), for example, has a planar shape extending in a longitudinal direction of the separation duct (31), and divides the internal space of the separation duct (31) into the first passage (32) and the second passage (33). Of the permeable film (35), a portion facing the first passage (32) forms a supply surface (36), and a portion facing the second passage (33) forms a permeable surface (37). The shapes of the separation duct (31) and the permeable film (35) are not limited thereto.

The permeable film unit (30) of the present embodiment is a parallel flow type in which indoor air flowing in the first passage (32) and outdoor air flowing in the second passage (33) flow in substantially the same direction.

In the permeable film unit (30), carbon dioxide in the indoor air flowing in the first passage (32) passes into the permeable film (35) from a side of the supply surface (36) of the permeable film (35), and the carbon dioxide that has passed into the permeable film (35) is discharged into the outdoor air flowing in the second passage (33) from the permeable surface (37).

<Carbon Dioxide Concentration Sensor>

Each ventilation unit (10) includes a carbon dioxide concentration sensor (40) that detects the concentration of carbon dioxide in the indoor air in the corresponding indoor space (R). Each carbon dioxide concentration sensor (40) is provided in, for example, the indoor space (R).

<Controller>

Each controller (50) is a controlling device for switching operations of the corresponding ventilation unit (10). Each controller includes a processor (for example, a CPU, a microprocessor, or other processing units that are capable of issuing execution instructions to a computer), a memory (for example, RAM, ROM, EEPROM, a flash memory, or other storage media that are capable of storing data), a communication interface for receiving and transmitting signals, and a program for causing the computer to function and execute each processing operation.

A signal detected by a certain carbon dioxide concentration sensor (40) (detected concentration) is input to the controller (50). The controller (50) controls the corresponding ventilation unit (10) so as to execute a first ventilation operation and a second ventilation operation. Specifically, for example, when the detected concentration provided by the carbon dioxide concentration sensor (40) is less than a predetermined value (a first condition), the controller (50) causes the air-supply-side adjusting mechanism (23) and the discharge-side adjusting mechanism (24) to be in the first state so that the first ventilation operation is executed. For example, when the detected concentration provided by the carbon dioxide concentration sensor (40) is greater than or equal to the predetermined value (a second condition), the controller (50) causes the air-supply-side adjusting mechanism (23) and the discharge-side adjusting mechanism (24) to be in the second state so that the second ventilation operation is executed.

Operations

In the ventilation system (S), operations are switched between the first ventilation operation and the second ventilation operation to execute the first ventilation operation and the second ventilation operation in each ventilation unit (10) shown in FIG. 1.

<First Ventilation Operation>

For example, the first ventilation operation is executed when the concentration of carbon dioxide in a certain indoor space (R) is relatively low. That is, when the detected concentration provided by the carbon dioxide concentration sensor (40) of a certain ventilation unit (10) is less than a predetermined value, the ventilation unit (10) executes the first ventilation operation. In the first ventilation operation, the air-supply-side adjusting mechanism (23) and the discharge-side adjusting mechanism (24) are in the first state. In the first ventilation operation, the air supply fan (21) and the discharge fan (22) are in an operation state. In the first ventilation operation, the permeable film unit (30) essentially does not operate.

When the air supply fan (21) operates, the outdoor air (OA) in the outdoor space (O) flows into the second outside air duct (17) and the air supply duct (13) in this order, and is supplied into the indoor space (R) as the supply air (SA). When the discharge fan (22) operates, the indoor air (RA) in the indoor space (R) flows into the second inside air duct (18) and the discharge duct (15) in this order, and is discharged into the outdoor space (O) as the discharge air (EA). Therefore, the indoor space (R) is ventilated.

<Second Ventilation Operation>

For example, the second ventilation operation is executed when the concentration of carbon dioxide in a certain indoor space (R) is relatively high. That is, when the detected concentration provided by the carbon dioxide concentration sensor (40) of a certain ventilation unit (10) is greater than or equal to a predetermined value, the ventilation unit (10) executes the second ventilation operation. In the second ventilation operation, the air-supply-side adjusting mechanism (23) and the discharge-side adjusting mechanism (24) are in the second state. In the second ventilation operation, the air supply fan (21) and the discharge fan (22) are in an operation state. In the second ventilation operation, the permeable film unit (30) operates.

When the air supply fan (21) operates, the indoor air in the indoor space (R) flows in the first passage (32) of the separation duct (31) via the first inside air duct (11). When the discharge fan (22) operates, the outdoor air in the outdoor space (O) flows in the second passage (33) of the separation duct (31) via the first outside air duct (14). In the separation duct (31), at the same time that the indoor air in the first passage (32) flows along the supply surface (36) of the permeable film (35), the outdoor air in the second passage (33) flows along the permeable surface (37) of the permeable film (35).

Here, the concentration of carbon dioxide in the indoor air in the first passage (32) is, for example, 1200 ppm, and the concentration of carbon dioxide in the outdoor air in the second passage (33) is, for example, 500 ppm. Therefore, the partial pressure of carbon dioxide in the indoor air in the first passage (32) is higher than the partial pressure of carbon dioxide in the outdoor air in the second passage (33). Consequently, a partial pressure difference occurs between the indoor air and the outdoor air on two respective sides of the permeable film (35). In the permeable film (35), the carbon dioxide is removed by making use of this partial pressure difference. That is, due to the partial pressure difference, the carbon dioxide in the indoor air in the first passage (32) passes through the interior of the permeable film (35) from the supply surface (36). Then, the carbon dioxide that has passed through the permeable film (35) is discharged into the outdoor air in the second passage (33) from the permeable surface (37). As a result, in the first passage (32), the concentration of carbon dioxide in the indoor air after the passage of carbon dioxide through the permeable film (35) is reduced. In contrast, in the second passage (33), the concentration of carbon dioxide in the outdoor air after the passage of carbon dioxide through the permeable film (35) is increased.

After air that has flown out from the first passage (32) has been mixed with the outdoor air introduced from the second outside air duct (17), the air is supplied into the indoor space (R) via the air supply duct (13). The indoor air that has circulated in the inside air passage (P1) is such that the concentration of carbon dioxide is reduced by the permeable film unit (30). Therefore, it is possible to reduce the concentration of carbon dioxide in the indoor space (R). In this way, by causing the indoor air in which the concentration of carbon dioxide has been reduced to circulate, it is possible to reduce the flow rate of outdoor air that is supplied into the indoor space (R). Therefore, it is possible to reduce the air-conditioning load of the air conditioner (3) at the indoor space (R) and to increase energy conservation.

After air that has flown out from the second passage (33) has been mixed with the indoor air introduced from the second inside air duct (18), the air is supplied into the outdoor space (O) via the discharge duct (15).

Advantageous Effects of Embodiment

The embodiment above makes it possible to continuously remove carbon dioxide in the indoor air by each permeable film unit (30) by making use of the partial pressure difference between carbon dioxide in indoor air and carbon dioxide in outdoor air. As a result, it is possible to reduce the concentration of carbon dioxide in each indoor space (R) and to reduce the ventilation amount of each indoor space (R). Therefore, it is possible to prevent an increase in the air-conditioning load of each air conditioner (3) caused by the ventilation from occurring and to increase energy conservation. In addition, as long as the permeable film units (30) are used, unlike chemical agents, such as adsorbents or absorbents, reduction in carbon dioxide removing capability due to continued use does not occur. Consequently, it is possible to remove carbon dioxide over a long period of time while reducing running costs and initial costs.

In each permeable film unit (30), both the indoor air and the outdoor air on the two respective sides of each permeable film (35) are continuous flows. Therefore, it is possible to reliably ensure the partial pressure difference between carbon dioxide in indoor air and carbon dioxide in outdoor air, and to ensure the separation performance of each permeable film (35).

In the ventilation system (S), the plurality of indoor spaces (R) are provided with respective ventilation units (10), and when the concentration of carbon dioxide in the indoor spaces (R) corresponding to the ventilation units (10) is greater than or equal to a predetermined value, the ventilation units (10) perform the second ventilation operation. Therefore, in the second ventilation operation, indoor air in which the concentration of carbon dioxide is relatively high flows in each inside air passage (P1). As a result, each ventilation unit (10) makes it possible to reliably ensure a difference between the partial pressures of carbon dioxide, and to ensure the separation performance of its corresponding permeable film (35).

As shown in FIG. 3, the flow path (the air supply duct (13)) on a downstream side of the permeable film (35) in the inside air passage (P1) is used both as a flow path for sending the indoor air from which carbon dioxide has been removed into the indoor space (R) again and as a flow path for sending the outdoor gas into the indoor space (R). In addition, the air supply fan (21) (the inside air fan) that is disposed in the air supply duct (13) is used both as a fan for circulating the indoor air and as a fan for supplying the outdoor air into the indoor space (R). Therefore, it is possible to reduce the cost of the ventilation system (S).

Similarly, the flow path (the discharge duct (15)) on a downstream side of the permeable film (35) in the outside air passage (P2) is used both as a flow path for discharging the outdoor air into which carbon dioxide has been discharged to the outdoor space (O) and as a flow path for discharging the indoor air in the indoor space (R) to the outdoor space (O). In addition, the discharge fan (22) (the discharge fan) that is disposed in the discharge duct (15) is used both as a fan for circulating the outdoor air and as a fan for discharging the indoor air into the outdoor space (O). Therefore, it is possible to further reduce the cost of the ventilation system.

Modifications

Modifications of the embodiment above are described. The embodiment above and the modifications that are described below may be combined or partly replaced as appropriate within a range that can be carried out.

<Modification 1>

Figure 4:
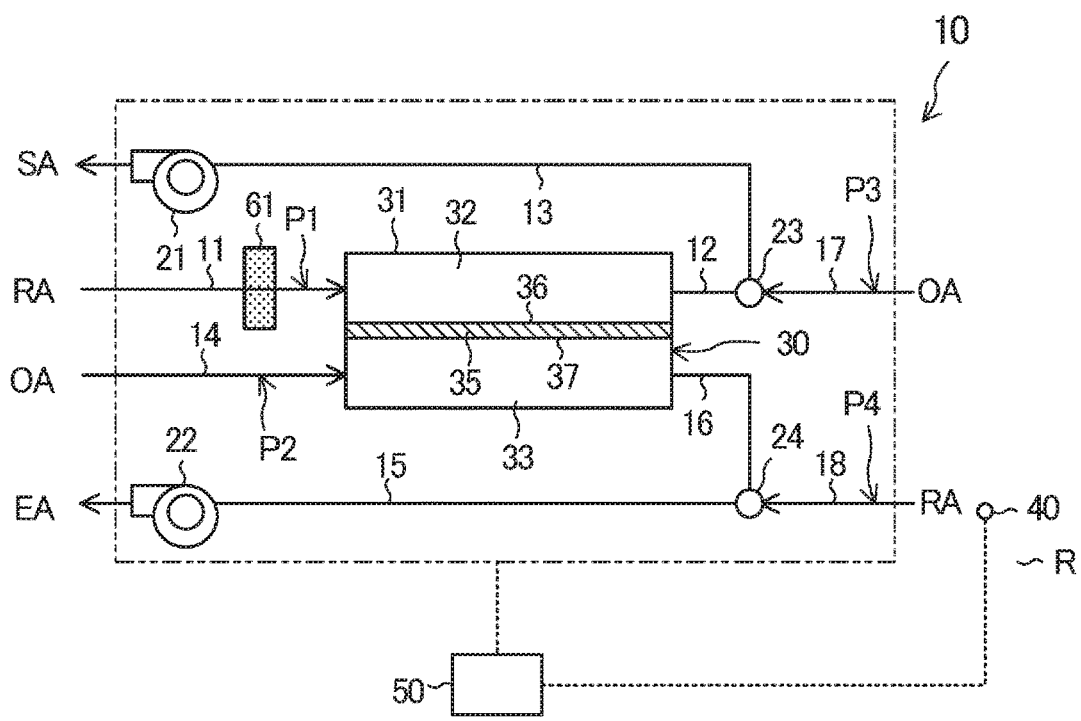
FIG. 4 is a structural view schematically showing the main portion of a ventilation unit according to Modification 1.

In Modification 1 shown in FIG. 4, a humidifier (61) is provided in a flow path (a first inside air duct (11)) on an upstream side of a permeable film (35) in an inside air passage (P1). The humidifier (61) is formed so as to add moisture to the permeable film (35) of a permeable film unit (30). Examples of types of the humidifier (61) include a type in which moisture is evaporated and air is humidified (for example, a boiling type, an ultrasonic type, and a spray type); and a type in which moisture is separated from, for example, an adsorbent, a sorption, or an absorbent and is sent into the air to humidify the air.

In Modification 1, after indoor air that has flown into the inside air passage (P1) has been humidified by the humidifier (61), the indoor air flows in a first passage (32) of the permeable film unit (30). Therefore, moisture is added to the permeable film (35) (more exactly, a supply surface (36) of the permeable film (35)) by the indoor air to maintain the humid state of the permeable film (35). As a result, in the permeable film (35), the carbon dioxide separation efficiency is increased.

The humidifier (61) is configured to make the humidification capability adjustable. Specifically, a controller (50) allows the humidifier (61) to be switched between operation/stop, and allows the amount of discharge of moisture into air to be finely adjusted during the operation of the humidifier (61). For example, the humidification capability of the humidifier (61) is adjusted in accordance with the detected concentration provided by a carbon dioxide concentration sensor (40).

For example, during the winter season, by operating the humidifier (61), it is possible to humidify air that is supplied into an indoor space (R) from the inside air passage (P1). That is, the humidifier (61) is used not only to humidify the permeable film (35) but also to humidify the indoor space (R) to be ventilated.

<Modification 2>

Figure 5:
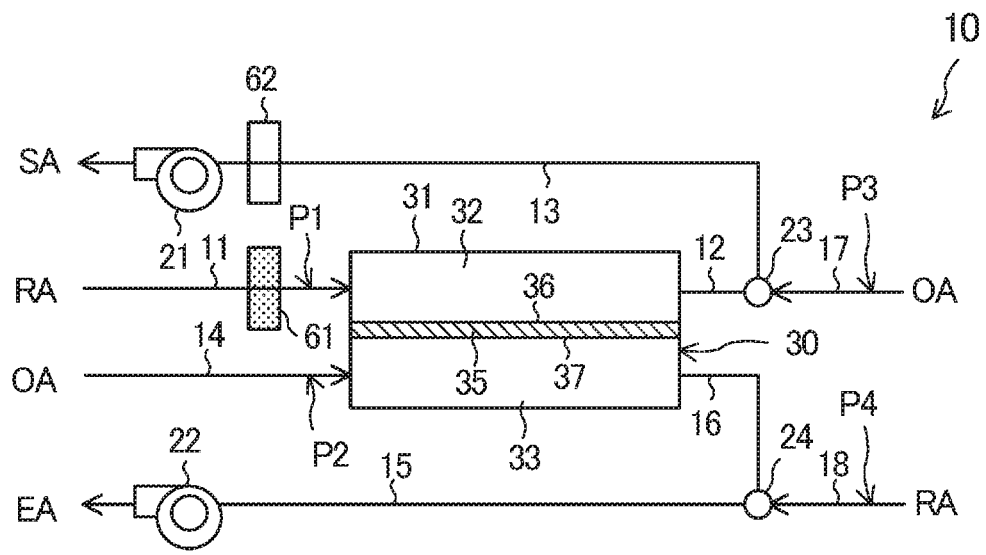
FIG. 5 is a structural view schematically showing the main portion of a ventilation unit according to Modification 2.

In Modification 2 shown in FIG. 5, a dehumidifier (62) is provided in a flow path (an air supply duct (13)) on a downstream side of a permeable film (35) in an inside air passage (P1). The dehumidifier (62) is formed so as to dehumidify air flowing in the air supply duct (13). Examples of types of the dehumidifier (62) include a type in which moisture is fixed to, for example, an adsorbent or a sorption; and a type in which moisture is absorbed by an absorbent. The dehumidifier (62) may also be of a type in which air is cooled down to a temperature less than or equal to the dew point temperature to remove the moisture in the air as condensed water.

In Modification 2, after indoor air that has flown into the inside air passage (P1) has been humidified by a humidifier (61), the indoor air flows in a first passage (32) of a permeable film (35). Therefore, moisture is added to the permeable film (35). Thereafter, air that has flown to the downstream side of the permeable film (35) in the inside air passage (P1) is dehumidified by the dehumidifier (62). As a result, it is possible to reduce the humidity of air that is supplied into an indoor space (R) from the inside air passage (P1).

For example, during the summer season, when highly humid air is supplied into the indoor space (R), the indoor space (R) is no longer comfortable. In contrast, in Modification 2, since the humidity of the air that is supplied into the indoor space (R) from the inside air passage (P1) can be reduced by the dehumidifier (62), it is possible to ensure the comfortableness of the interior of a room.

<Modification 3>

Figure 6:
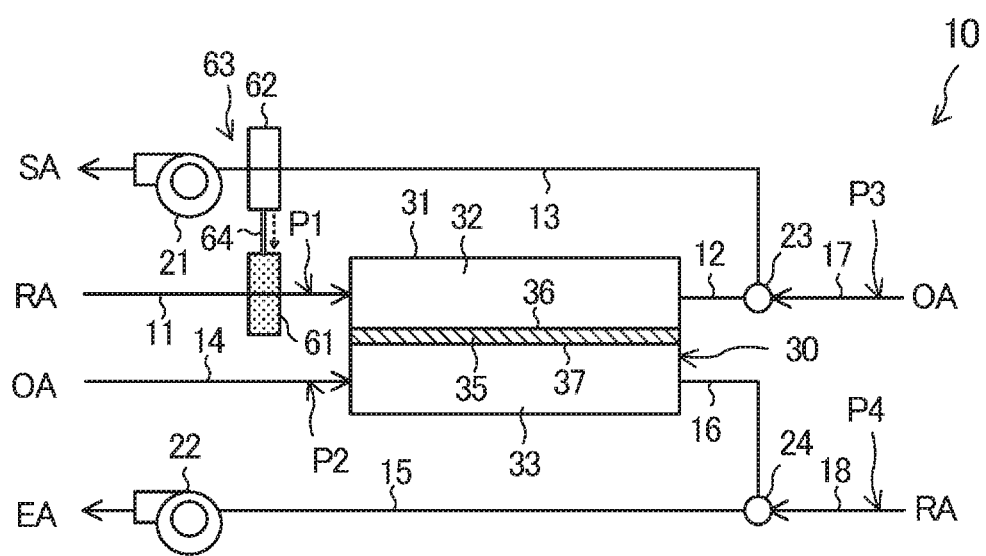
FIG. 6 is a structural view schematically showing the main portion of a ventilation unit according to Modification 3.

In Modification 3 shown in FIG. 6, the humidifier (61) and the dehumidifier (62) according to Modification 2 are incorporated in a humidifier/dehumidifier unit (63). The humidifier/dehumidifier unit (63) includes a water supplying section (64) that sends moisture taken away from the air by the dehumidifier (62) into the humidifier (61). That is, the humidifier (61) is formed so as to make use of the moisture removed by the dehumidifier (62) as humidifying water. Therefore, in the humidifier/dehumidifier unit (63), the amount of water that is separately supplied to the humidifier (61) is zero or can be reduced.

<Modification 4>

Figure 7:
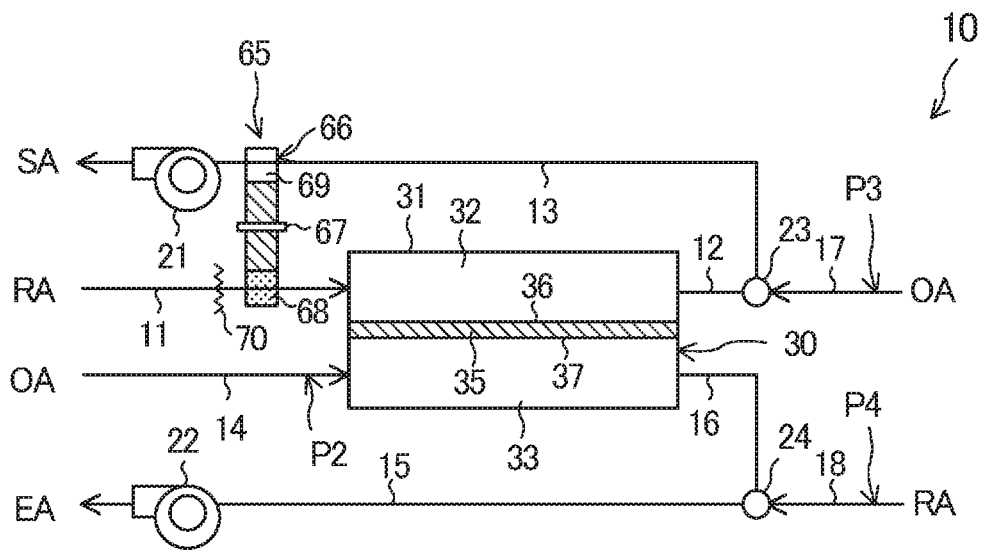
FIG. 7 is a structural view schematically showing the main portion of a ventilation unit according to Modification 4.

In Modification 4 shown in FIG. 7, a humidifier/dehumidifier rotor (65) is provided in both a flow path (a first inside air duct (11)) on an upstream side of a permeable film (35) in an inside air passage (P1) and a flow path (an air supply duct (13)) on a downstream side of the permeable film (35) in the inside air passage (P1). The humidifier/dehumidifier rotor (65) includes a rotor main body (66) disposed in both the first inside air duct (11) and an air supply duct (13), and a drive shaft (67) that rotationally drives the rotor main body (66). The rotor main body (66) carries an adsorbent that is capable of adsorbing and desorbing moisture.

A desorption region (68) where moisture is discharged into air is formed on a portion of the rotor main body (66) that is positioned on the side of the first inside air duct (11). An adsorption region (69) where moisture in air is adsorbed is formed on a portion of the rotor main body (66) that is positioned on the side of the air supply duct (13). In the first inside air duct (11), a heating section (for example, a heater (70)) for heating air is provided on an upstream side of the desorption region (68) of the rotor main body (66). The desorption region (68) forms a humidifier for adding moisture to the permeable film (35). The adsorption region (69) forms a dehumidifier for dehumidifying air that is supplied into an indoor space (R).

In Modification 4, after indoor air that has flown into the inside air passage (P1) has been heated by the heater (70), the indoor air flows in the desorption region (68) of the rotor main body (66). When the adsorbent of the desorption region (68) is heated by the air, the moisture is desorbed from the adsorbent and is discharged into the air. As a result, the air is humidified. The air that has been humidified in this way flows in a first passage (32) at the permeable film (35), so that the moisture is added to the permeable film (35).

Thereafter, the air that has flown to the downstream side of the permeable film (35) in the inside air passage (P1) flows in the adsorption region (69) of the rotor main body (66). In the adsorption region (69), the moisture in the air is adsorbed by the adsorbent, and the air is dehumidified. In the humidifier/dehumidifier rotor (65), by rotationally driving the rotor main body (66) by the drive shaft (67), the adsorbent that has adsorbed the moisture in the adsorption region (69) is displaced to the desorption region (68). At the same time, the adsorbent from which the moisture has been desorbed in the desorption region (68) is displaced to the adsorption region (69). As a result, the humidifier/dehumidifier rotor (65) is capable of continuously and at the same time humidifying air in the first inside air duct (11) and dehumidifying the air in the air supply duct (13).

<Modification 5>

Figure 8:
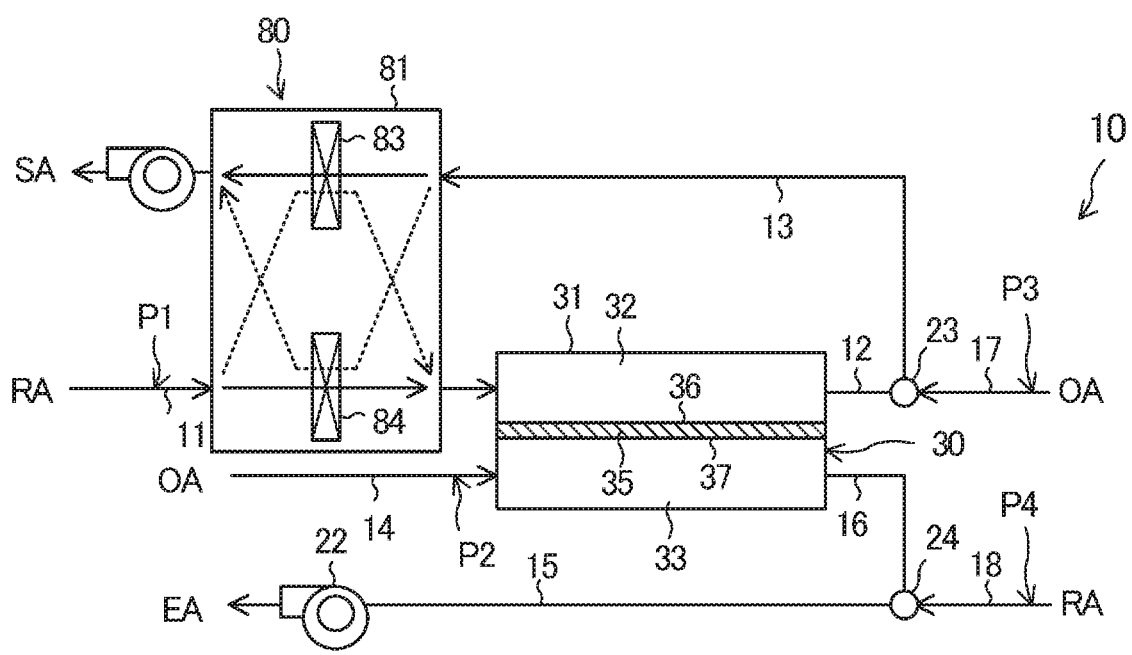
FIG. 8 is a structural view schematically showing the main portion of a ventilation unit according to Modification 5.

In Modification 5 shown in FIG. 8, a humidity control unit (80) is provided in both a first inside air duct (11) and an air supply duct (13). The humidity control unit (80) includes a hollow humidity-control casing (81) and a first adsorption heat exchanger (83) and a second adsorption heat exchanger (84) that are accommodated inside the humidity-control casing (81).

The first adsorption heat exchanger (83) and the second adsorption heat exchanger (84) are heat exchangers that carry an adsorbent (to be exact, also called a sorption), and are connected to a refrigerant circuit filled with a refrigerant. A compressor, an expansion valve, and a four-way switching valve are connected (not shown) to the refrigerant circuit, and the circulation direction of the refrigerant is reversible in accordance with the state of the four-way switching valve. Therefore, in the refrigerant circuit, a first refrigeration cycle and a second refrigeration cycle are performed by switching between the cycles. In the first refrigeration cycle, after the refrigerant compressed by the compressor is condensed by the second adsorption heat exchanger (84) and has its pressure reduced by the expansion valve, the refrigerant evaporates at the first adsorption heat exchanger (83). In the second refrigeration cycle, after the refrigerant compressed by the compressor is condensed by the first adsorption heat exchanger (83) and has its pressure reduced by the expansion valve, the refrigerant is evaporated at the second adsorption heat exchanger (84).

An air flow path switching section (not shown) is provided inside the humidity-control casing (81). The air flow path switching section includes a plurality of air flow paths and a damper that switches a disconnection state of each air flow path. The state of the air flow path switching section is switched between a first state in which a first air flow path (a flow path schematically shown by a solid line in FIG. 8) is formed inside the humidity-control casing (81) and a second state in which a second air flow path (a flow path schematically shown by a broken line in FIG. 8) is formed inside the humidity-control casing (81).

In the first air flow path, at the same time that air that has flown into the humidity-control casing (81) from the first inside air duct (11) passes through the second adsorption heat exchanger (84) and is sent to the side of a permeable film unit (30), air that has flown into the humidity-control casing (81) from the side of the permeable film unit (30) passes through the first adsorption heat exchanger (83) and is sent to the side of an indoor space (R). In the second air flow path, at the same time that air that has flown into the humidity-control casing (81) from the first inside air duct (11) passes through the first adsorption heat exchanger (83) and is sent to the side of the permeable film unit (30), air that has flown into the humidity-control casing (81) from the side of the permeable film unit (30) passes through the second adsorption heat exchanger (84) and is sent to the side of the indoor space (R).

In the humidity control unit (80), a first operation and a second operation below are alternately and repeatedly executed each time a predetermined time (a few minutes) has elapsed.

In the first operation, in the refrigerant circuit, at the same time that the first refrigeration cycle is performed, the first air flow path is formed. Therefore, air that has flown into the humidity-control casing (81) from the first inside air duct (11) flows in the second adsorption heat exchanger (84) that becomes a condenser. In the second adsorption heat exchanger (84), an adsorbent is heated by a condensed refrigerant and moisture adsorbed by the adsorbent is discharged into air. Consequently, in the second adsorption heat exchanger (84), the air is humidified. The humidified air is sent into the first passage (32) of the permeable film unit (30) and adds moisture to the permeable film (35).

In the first operation, air that has flown into the humidity-control casing (81) from the side of the permeable film unit (30) flows in the first adsorption heat exchanger (83) that becomes an evaporator. In the first adsorption heat exchanger (83), moisture in air is adsorbed by an adsorbent. Adsorption heat that is produced at this time becomes evaporation heat of a refrigerant. Therefore, in the first adsorption heat exchanger (83), the air is dehumidified. The dehumidified air is sent into the indoor space (R) again.

As described above, in the first operation, the second adsorption heat exchanger (84) that becomes a condenser functions as a humidifier, and the first adsorption heat exchanger (83) that becomes an evaporator functions as a dehumidifier.

In the second operation, in the refrigerant circuit, at the same time that the second refrigeration cycle is performed, the second air flow path is formed. Therefore, air that has flown into the humidity-control casing (81) from the first inside air duct (11) flows in the first adsorption heat exchanger (83) that becomes a condenser. In the first adsorption heat exchanger (83), an adsorbent is heated by a refrigerant that is condensed and moisture adsorbed by the adsorbent is discharged into air. Consequently, in the first adsorption heat exchanger 83), the air is humidified. The humidified air is sent into the first passage (32) of the permeable film unit (30) and adds moisture to the permeable film (35).

In the second operation, air that has flown into the humidity-control casing (81) from the side of the permeable film unit (30) flows in the second adsorption heat exchanger (84) that becomes an evaporator. In the second adsorption heat exchanger (84), moisture in air is adsorbed by an adsorbent. Adsorption heat that is produced at this time becomes evaporation heat of a refrigerant. Therefore, in the second adsorption heat exchanger (84), the air is dehumidified. The dehumidified air is sent into the indoor space (R) again.

As described above, in the second operation, the first adsorption heat exchanger (83) that becomes a condenser functions as a humidifier, and the second adsorption heat exchanger (84) that becomes an evaporator functions as a dehumidifier.

<Modification 6>

Figure 9:
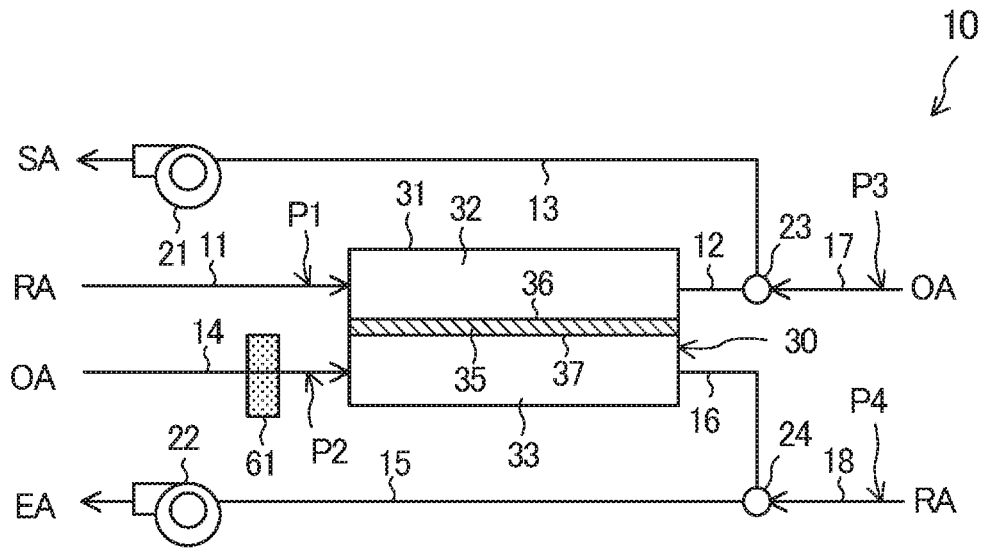
FIG. 9 is a structural view schematically showing the main portion of a ventilation unit according to Modification 6.

In Modification 6 shown in FIG. 9, a humidifier (61) is provided on an upstream side of a permeable film (35) in an outside air passage (P2). The humidifier (61) is formed so as to add moisture to the permeable film (35) of a permeable film unit (30). In Modification 6, after outdoor air that has flown into an outside air passage (P2) has been humidified by the humidifier (61), the outdoor air flows in a second passage (33) of the permeable film unit (30). Therefore, moisture is added to the permeable film (35) (more exactly, a permeable surface (37) of the permeable film (35)) by the outdoor air to maintain the humid state of the permeable film (35). As a result, in the permeable film (35), the carbon dioxide separation efficiency is increased.

<Modification 7>

Figure 10:
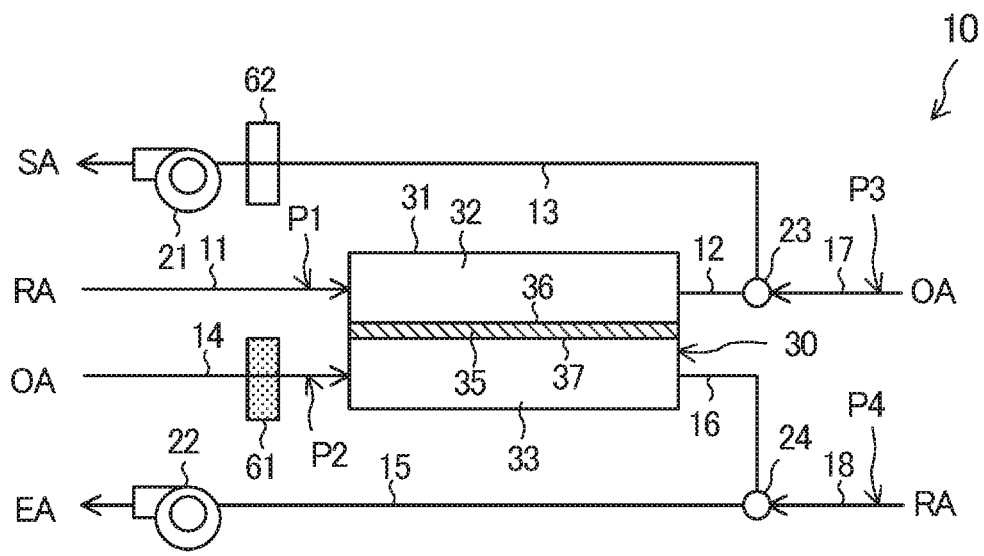
FIG. 10 is a structural view schematically showing the main portion of a ventilation unit according to Modification 7.

In Modification 7 shown in FIG. 10, a dehumidifier (62) is provided in a flow path (an air supply duct (13)) on a downstream side of a permeable film (35) in an inside air passage (P1). Therefore, during, for example, the summer season, it is possible to dehumidify air that is supplied into an indoor space (R) and to ensure the comfortableness of the indoor space (R).

<Modification 8>

Figure 11:
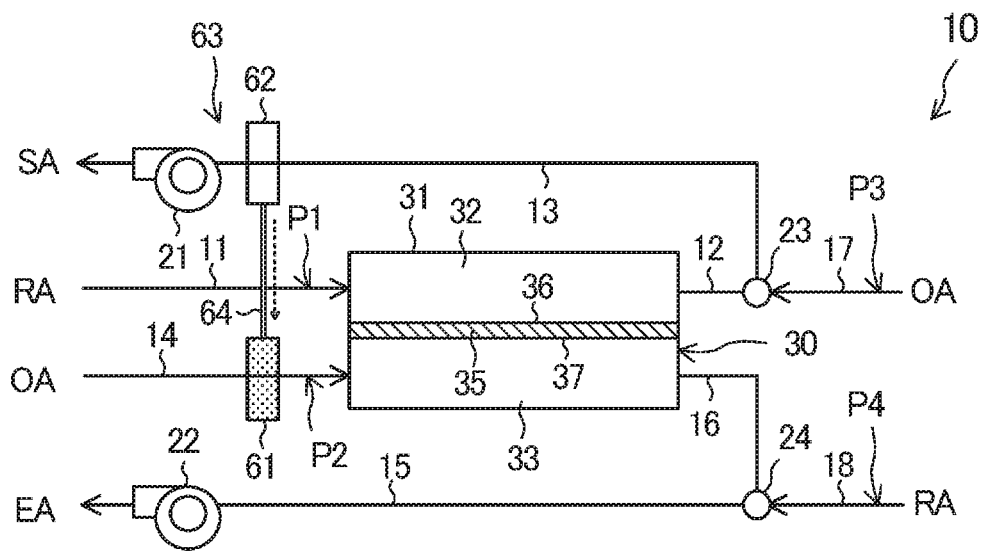
FIG. 11 is a structural view schematically showing the main portion of a ventilation unit according to Modification 8.

In Modification 8 shown in FIG. 11, the humidifier (61) and the dehumidifier (62) according to Modification 7 are incorporated in a humidifier/dehumidifier unit (63). The structure, operation, and advantageous effects of the humidifier/dehumidifier unit (63) are the same as those in Modification 3.

<Modification 9>

Figure 12:
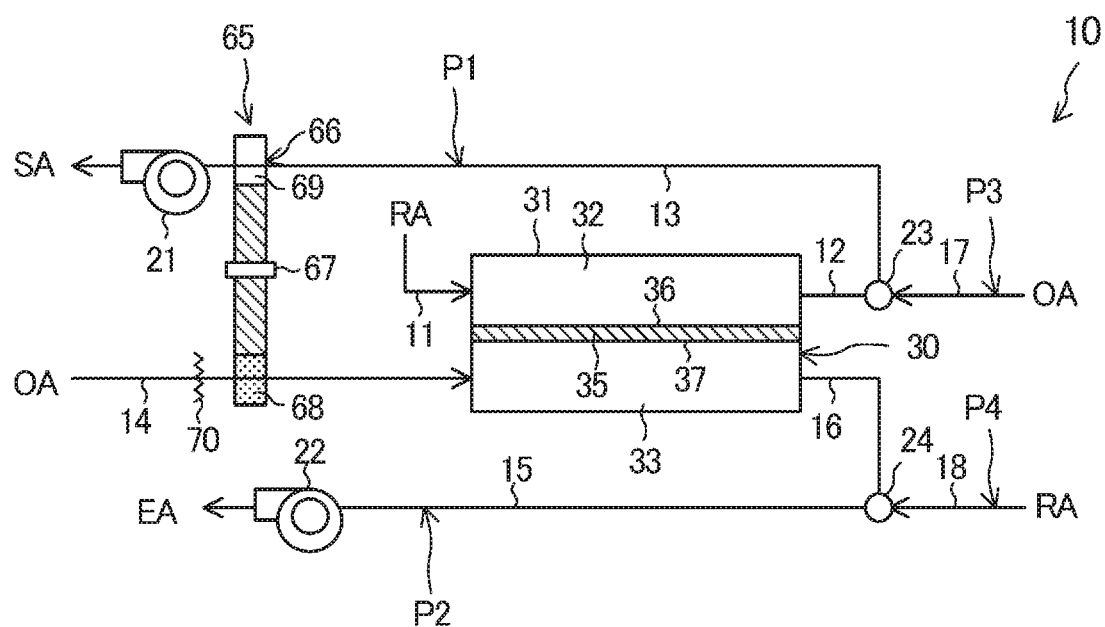
FIG. 12 is a structural view schematically showing the main portion of a ventilation unit according to Modification 9.

In Modification 9 shown in FIG. 12, a humidifier/dehumidifier rotor (65) is provided in both a flow path (a first outside air duct (14)) on an upstream side of a permeable film (35) in an outside air passage (P2) and a flow path (an air supply duct (13)) on a downstream side of the permeable film (35) in an inside air passage (P1). The structure, operation, and advantageous effects of the humidifier/dehumidifier rotor (65) are the same as those in Modification 4.

<Modification 10>

Figure 13:
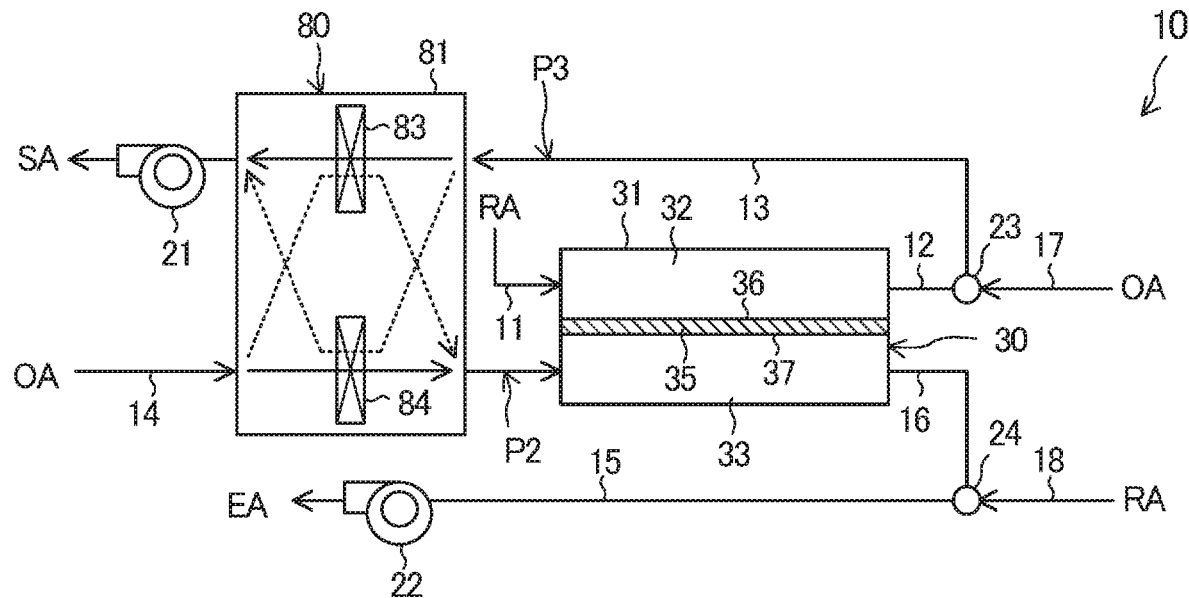
FIG. 13 is a structural view schematically showing the main portion of a ventilation unit according to Modification 10.

In Modification 10 shown in FIG. 13, a humidity control unit (8O) is provided in both a flow path (a first outside air duct (14)) on an upstream side of a permeable film (35) in an outside air passage (P2) and a flow path (an air supply duct (13)) on a downstream side of the permeable film (35) in an inside air passage (P1). The structure, operation, and advantageous effects of the humidity control unit (80) are the same as those in Modification 5.

<Modification 11>

Figure 14:
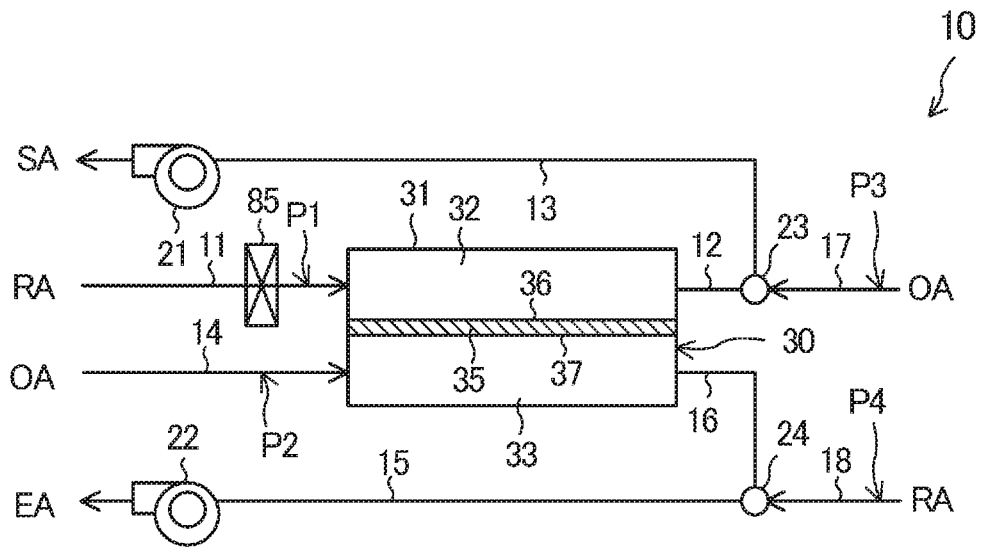
FIG. 14 is a structural view schematically showing the main portion of a ventilation unit according to Modification 11.

In Modification 11 shown in FIG. 14, a cooling section (85) that cools air is provided in a flow path (a first inside air duct (11)) on an upstream side of a permeable film (35) in an inside air passage (P1). The cooling section (85) is formed from, for example, an evaporator connected to a refrigerant circuit. In Modification 11, indoor air that flows in the first inside air duct (11) is cooled by the cooling section (85), so that the relative humidity of the indoor air is increased. As a result, it is easy to maintain the humid state of the permeable film (35) and to increase the separation efficiency of carbon dioxide at the permeable film (35).

<Modification 12>

Figure 15:
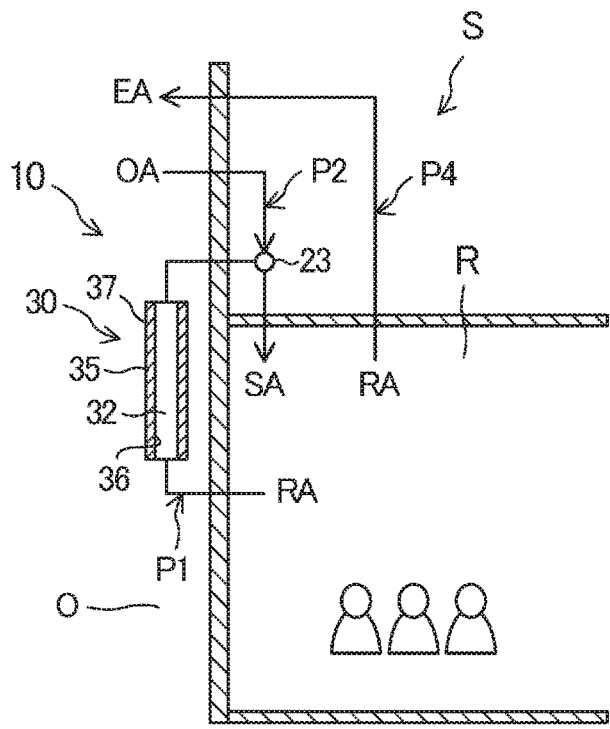
FIG. 15 is a structural view schematically showing the main portion of a ventilation unit according to Modification 12.

Modification 12 shown in FIG. 15 differs from the embodiment above in the structure of a permeable film unit (30) and the structures of ducts. The permeable film unit (30) is disposed in an outdoor space (O). The permeable film unit (30) includes, for example, a cylindrical permeable film (35) and has a first passage (32), which is a part of an inside air passage (P1), formed therein. That is, an inner peripheral surface of the permeable film (35) is a supply surface (36) and an outer peripheral surface of the permeable film (35) is a permeable surface (37).

An outflow end of an air supply passage (P3) is connected to a downstream side of the permeable film (35) in the inside air passage (P1). An air supply fan (an inside air fan) (not shown) is provided on a downstream side of a connection portion of the air supply passage (P3) in the inside air passage (P1). An air-supply-side adjusting mechanism (23) that is the same as that in the embodiment above is provided at a connection portion where the inside air passage (P1) and the air supply passage (P3) are connected to each other.

A ventilation unit (10) includes a discharge passage (P4) including an inflow end that communicates with an indoor space (R) and an outflow end that communicates with an outdoor space (O). A discharge fan (not shown) is provided in the discharge passage (P4).

In Modification 12, for example, in the first ventilation operation, as in the embodiment above, the air-supply-side adjusting mechanism (23) is in the first state. Therefore, in the first ventilation operation, outdoor air is supplied into the indoor space (R) via the air supply passage (P3) and the inside air passage (P1) without the permeable film unit (30) being operated. At the same time, indoor air is discharged into the outdoor space (O) via the discharge passage (P4).

On the other hand, in the second ventilation operation, as in the embodiment above, the air-supply-side adjusting mechanism (23) is in the second state. Therefore, in the second ventilation operation, indoor air flows into the inside air passage (P1) and flows in the first passage (32) of the permeable film unit (30). In the permeable film unit (30), due to the partial pressure difference between carbon dioxide in the indoor air that flows in the first passage (32) and carbon dioxide in outdoor air surrounding the permeable film (35), the carbon dioxide in the indoor air passes through the permeable film (35) and is discharged into the outdoor space (O). After the indoor air from which carbon dioxide has been removed has been mixed with the outdoor air that has been sent from the air supply passage (P3), the indoor air is supplied into the indoor space (R). At the same time, indoor air is discharged into the outdoor space (O) via the discharge passage (P4).

As described above, even in Modification 12, in the second ventilation operation, it is possible to reduce the concentration of carbon dioxide in the indoor space (R). As a result, it is possible to reduce the ventilation amount of the indoor space (R) and to thus reduce the air-conditioning load of an air conditioner (3), <Modification 13>

Figure 16:
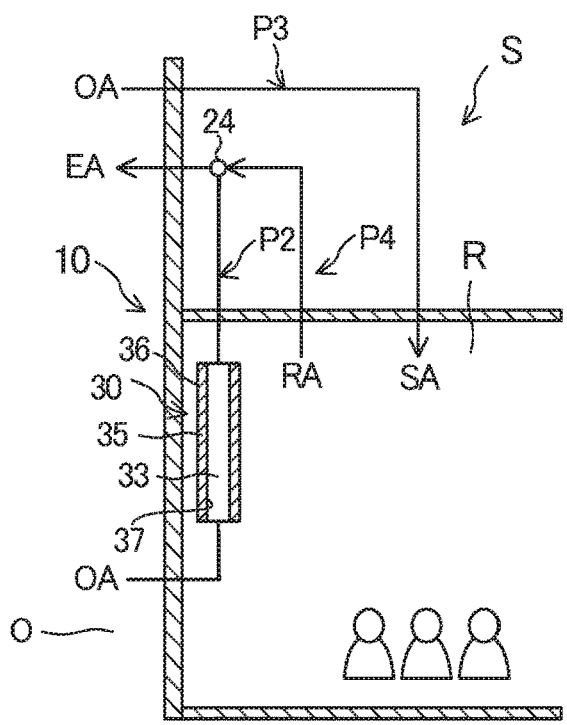
FIG. 16 is a structural view schematically showing the main portion of a ventilation unit according to Modification 13.

Modification 13 shown in FIG. 16 differs from the embodiment above in the structure of a permeable film unit (30) and the structures of ducts. The permeable film unit (30) is disposed in an indoor space (R). The permeable film unit (30) includes, for example, a cylindrical permeable film (35) and has a second passage (33), which is a part of an outside air passage (P2), formed therein. That is, an inner peripheral surface of the permeable film (35) is a supply surface (36) and an outer peripheral surface of the permeable film (35) is a permeable surface (37).

An outflow end of a discharge passage (P4) is connected to a downstream side of the permeable film (35) in the outside air passage (P2). A discharge fan (an outside air fan) (not shown) is provided on a downstream side of a connection portion of the discharge passage (P4) in the outside air passage (P2). A discharge-side adjusting mechanism (24) that is the same as that in the embodiment above is provided at a connection portion where the outside air passage (P2) and the discharge passage (P4) are connected to each other.

A ventilation unit (10) includes an air supply passage (P3) including an inflow end that communicates with an outdoor space (O) and an outflow end that communicates with the indoor space (R). An air supply fan (not shown) is provided in the air supply passage (P3).

In Modification 13, for example, in the first ventilation operation, as in the embodiment above, the discharge-side adjusting mechanism (24) is in the first state. Therefore, in the first ventilation operation, indoor air is discharged into the outdoor space (O) via the discharge passage (P4) and the outside air passage (P2) without the permeable film unit (30) being operated. At the same time, outdoor air is supplied into the indoor space (R) via the air supply passage (P3).

On the other hand, in the second ventilation operation, as in the embodiment above, the discharge-side adjusting mechanism (24) is in the second state. Therefore, in the second ventilation operation, outdoor air flows into the outside air passage (P2) and flows in the second passage (33) of the permeable film unit (30). In the permeable film unit (30), due to the partial pressure difference between carbon dioxide in indoor air that flows in the second passage (33) and carbon dioxide in indoor air surrounding the permeable film (35), the carbon dioxide in the indoor air in the indoor space (R) passes through the permeable film (35) and is discharged into the second passage (33). After outdoor air to which the carbon dioxide in the indoor air has been discharged is mixed with the indoor air that has been sent from the discharge passage (P4), the outdoor air is discharged into the outdoor space (O). At the same time, outdoor air is supplied into the indoor space (R) via the air supply passage (P3).

As described above, even in Modification 13, in the second ventilation operation, it is possible to reduce the concentration of carbon dioxide in the indoor space (R). As a result, it is possible to reduce the ventilation amount of the indoor space (R) and to thus reduce the air-conditioning load of an air conditioner (3).

<Modification 14>

Figure 17:
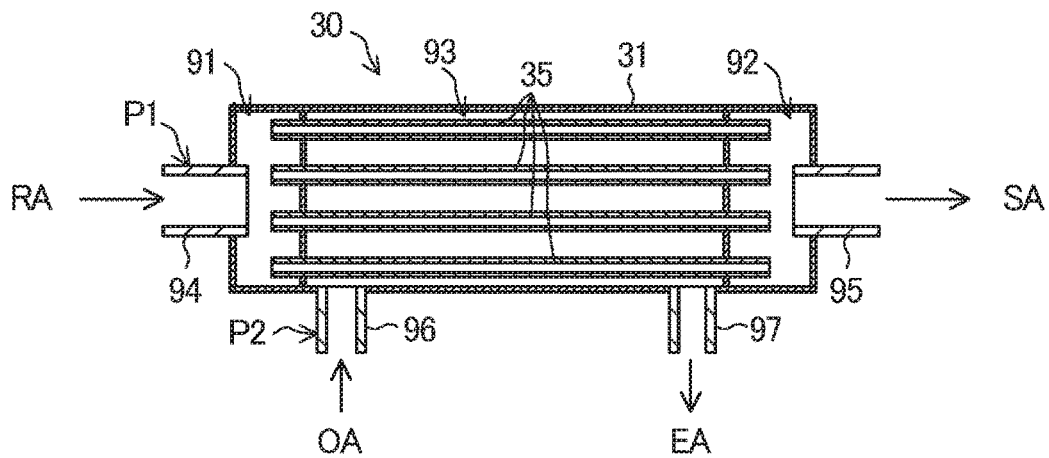
FIG. 17 is a structural view schematically showing the main portion of a ventilation unit according to Modification 14.

Modification 14 shown in FIG. 17 differs from the embodiment above in the structure of a permeable film unit (30). The permeable film unit (30) includes a hollow cylindrical separation duct (31) and a plurality of permeable films (35) that are disposed inside the separation duct (31).

The separation duct (31) has, for example, a vertically long cylindrical shape, and the inside of the separation duct is divided into a first header space (91), a second header space (92), and a center space (93). The first header space (91) is formed towards one end (towards the left in FIG. 18) of the separation duct (31) in an axial direction. The second header space (92) is formed towards the other end (towards the right in FIG. 18) of the separation duct (31) in the axial direction. The center space (93) is formed between the first header space (91) and the second header space (92).

A first inflow pipe (94) is connected to one end side of the separation duct (31), and a first outflow pipe (95) is connected to the other end side of the separation duct (31). An outflow end of the first inflow pipe (94) communicates with the first header space (91), and an inflow end of the first outflow pipe (95) communicates with the second header space (92).

A second inflow pipe (96) and a second outflow pipe (97) are connected to a peripheral wall of the separation duct (31). The second inflow pipe (96) communicates with a portion towards one end side of the separation duct (31) in the center space (93), and the second outflow pipe (97)

communicates with a portion towards the other end side of the separation duct (31) in the center space (93).

The plurality of permeable films (35) are formed of a vertically long cylindrical hollow fiber membrane. Each permeable film (35) extends in the axial direction of the separation duct (31), and a large portion of each permeable films (35) is positioned in the center space (93). An opening on one end side of each permeable film (35) in the axial direction communicates with the first header space (91). An opening on the other end side of each permeable film (35) in the axial direction communicates with the second header space (92).

In the permeable film unit (30) of Modification 14, for example, indoor air is sent into the first header space (91) from the first inflow pipe (94). The indoor air that has flown into the first header space (91) flows in the inside of each permeable film (35). On the other hand, outdoor air is sent into the center space (93) from the second inflow pipe (96) and flows around each permeable film (35). Therefore, carbon dioxide in the indoor air inside each permeable film (35) passes through each permeable film (35) and is discharged into the outdoor air surrounding the permeable films (35).

After the indoor air from which the carbon dioxide has been removed inside each permeable film (35) has merged at the second header space (92), the indoor air flows in the first outflow pipe (95) and is supplied into an indoor space (R) again. The outdoor air to which the carbon dioxide has been discharged in the center space (93) flows in the second outflow pipe (97) and is discharged into an outdoor space (O).

<Modification 15>

Figure 18:
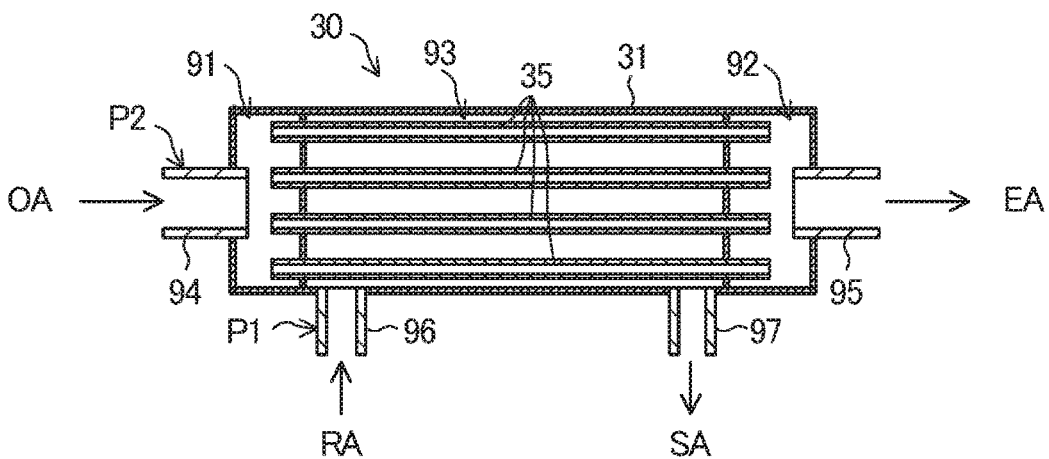
FIG. 18 is a structural view schematically showing the main portion of a ventilation unit according to Modification 15.

Modification 15 shown in FIG. 18 differs from the embodiment above in air flow in a structure similar to that of the permeable film unit (30) of Modification 14. Specifically, outdoor air flows in a first inflow pipe (94), a first header space (91), each permeable film (35), a second header space (92), and a first outflow pipe (95) in this order, and is discharged into an outdoor space (O). Indoor air flows in a second inflow pipe (96), a center space (93), and a second outflow pipe (97) in this order, and is supplied into an indoor space (R).

<Modification 16>

Figure 19:
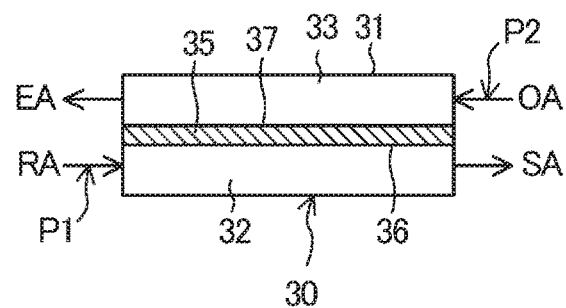
FIG. 19 is a structural view schematically showing the main portion of a ventilation unit according to Modification 16.

A permeable film unit (30) of Modification 16 shown in FIG. 19 is formed as a counterflow type. That is, the direction of flow of indoor air flowing along a supply surface (36) of a permeable film (35) and the direction of flow of outdoor air flowing along the permeable film (35) are opposite to each other, Detailed Description of Adjusting Mechanisms The above-described air-supply-side adjusting mechanism (23), the above-described discharge-side adjusting mechanism (24), and peripheral structures thereof are described in detail with reference to FIG. 20.

<Air Passage>

Figure 20:
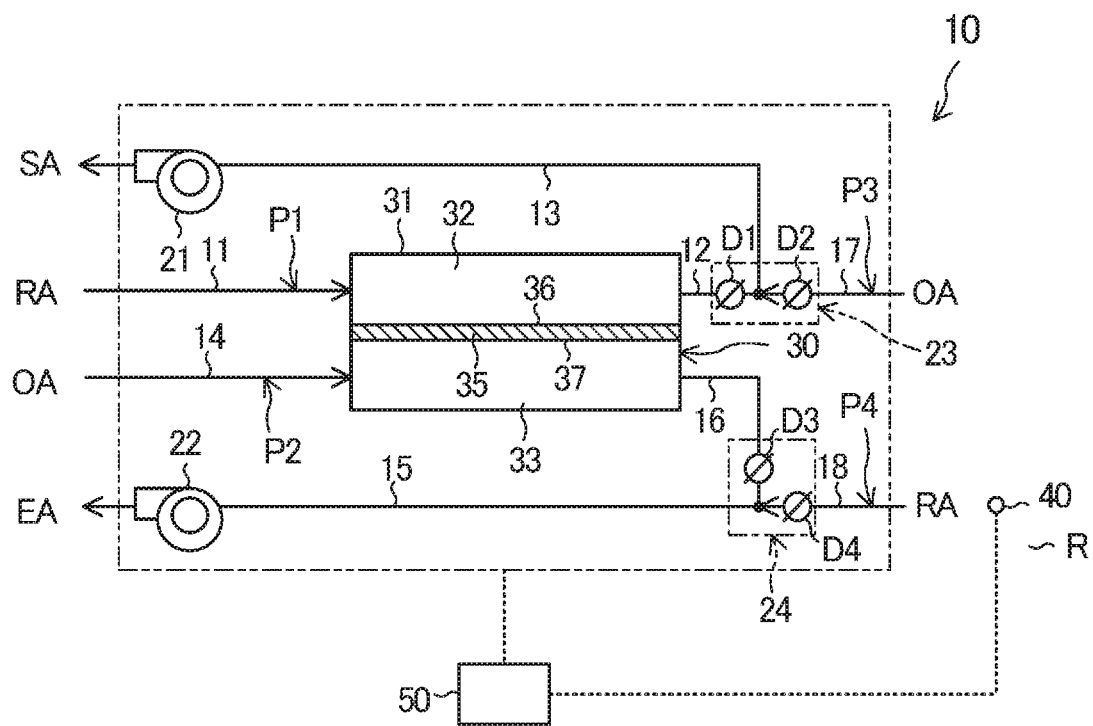
FIG. 20 is a figure corresponding to FIG. 3 for illustrating in detail an air-supply-side adjusting mechanism and a discharge-side adjusting mechanism.

A ventilation system (S) in FIG. 20 has a structure that is basically the same as the structure in the embodiment above (FIG. 3). That is, the ventilation system (S) includes an inside air passage (P1) having an inflow end and an outflow end that each communicate with an indoor space (R) to be ventilated, and an air supply passage (P3) having an inflow end that communicates with an outdoor space (O) and an outflow end that is connected to a downstream side of a permeable film (35) (a permeable film unit (30)) in the inside air passage (P1). The inside air passage (P1) includes inside air introducing paths (11, 12) on an upstream side of a connection portion of the air supply passage (P3) and an inside air supply path (13) on a downstream side of the connection portion of the air supply passage (P3). The inside air introducing paths (11, 12) are flow paths including a corresponding one of the first inside air duct (11) and the inside air relay duct (12) of the embodiment above. The inside air supply path corresponds to the air supply duct (13) of the embodiment above. An air supply fan (21) is disposed on a downstream side of the connection portion of the air supply passage (P3) in the inside air passage (P1) (that is, at the air supply duct (13)).

The ventilation system (S) includes an outside air passage (P2) having an inflow end and an outflow end that each communicate with the outdoor space (O), and a discharge passage (P4) having an inflow end that communicates with the indoor space (R) and an outflow end that is connected to a downstream side of the permeable film (35) in the outside air passage (P2). The outside air passage (P2) includes outside air introducing paths (14, 16) on an upstream side of a connection portion of the discharge passage (P4) and an outside air discharge path (15) on a downstream side of the connection portion of the discharge passage (P4). The outside air introducing paths (14, 16) are flow paths including a corresponding one of the first outside air duct (14) and the outside air relay duct (16) of the embodiment above. The outside air discharge path (15) corresponds to the discharge duct (15) of the embodiment above. A discharge fan (22) is disposed on a downstream side of the connection portion of the discharge passage (P4) in the outside air passage (P2).

<Air-Supply-Side Adjusting Mechanism>

The air-supply-side adjusting mechanism (23) adjusts the flow rate of air that flows in the inside air introducing paths (11, 12) and the flow rate of air that flows in the air supply passage (P3). Here, the air flow rates include a zero air flow rate. For example, the air-supply-side adjusting mechanism (23) includes a first damper (D1) that is disposed in an inside air introducing path (11, 12) (for example, the inside air relay duct (12)), and a second damper (D2) that is disposed in the air supply passage (P3) (the second outside air duct (17)). The first damper (D1) and the second damper (D2) of this example are formed so as to open or close the corresponding air flow path. The first damper (D1) and the second damper (D2) may each be a damper that finely changes the opening degree of the corresponding air flow path. The air-supply-side adjusting mechanism (23) may be a damper, a flow rate adjusting valve, an on-off valve, and an auxiliary fan that are provided in at least one of the inside air introducing paths (11, 12) and the air supply passage (P3). Even these are capable of adjusting one or both of the flow rate of air that flows in the inside air introducing paths (11, 12) and the flow rate of air that flows in the air supply passage (P3).

<Discharge-Side Adjusting Mechanism>

The discharge-side adjusting mechanism (24) adjusts the flow rate of air that flows in the outside air introducing paths (14, 16) and the flow rate of air that flows in the discharge passage (P4). Here, the air flow rates include a zero air flow rate. For example, the discharge-side adjusting mechanism (24) includes a third damper (D3) that is disposed in an outside air introducing path (14, 16) (for example, the outside air relay duct (16)), and a fourth damper (D4) that is disposed in the discharge passage (P4) (the second inside air duct (18)). The third damper (D3) and the fourth damper (D4) of this example are formed so as to open or close the corresponding air flow path. The third damper (D3) and the fourth damper (D4) may each be a damper that finely changes the opening degree of the corresponding air flow path. The discharge-side adjusting mechanism (24) may be a damper, a flow rate adjusting valve, an on-off valve, and an auxiliary fan that are provided in at least one of the outside air introducing paths (14, 16) and the discharge passage (P4). Even these are capable of adjusting one or both of the flow rate of air that flows in the outside air introducing paths (14, 16) and the flow rate of air that flows in the discharge passage (P4).

A carbon dioxide concentration sensor (40) that detects the concentration of carbon dioxide is provided in the indoor space (R). The carbon dioxide concentration sensor (40) forms a concentration detecting section that detects the concentration of target gas in the permeable film unit (30).

The ventilation system (S) includes a controller (50) that is a controlling device. The controller (50) controls the air-supply-side adjusting mechanism (23) and the discharge-side adjusting mechanism (24) on the basis of the concentration of carbon dioxide detected by the carbon dioxide concentration sensor (40). Specifically, the controlling device (50) switches an open-close state of the first damper (D1), the second damper (D2), the third damper (D3), and the fourth damper (D4).

<Circulation Operation>

For example, when the first condition in which the detected concentration provided by the carbon dioxide concentration sensor (40) is less than a predetermined value (for example, 1000 ppm) is met, the indoor air and the outdoor air are circulated. That is, when the first condition is met, the controlling device (50) causes the air-supply-side adjusting mechanism (23) to be in the first state so that the inside air introducing paths (11, 12) and the inside air supply path (13) communicate with each other and the air supply passage (P3) and the inside air supply path (13) are disconnected from each other. In the air-supply-side adjusting mechanism (23) in the first state, the first damper (D1) is caused to be in an open state, and the second damper (D2) is caused to be in a closed state. When the first condition is met, the controlling device (50) causes the discharge-side adjusting mechanism (24) to be in the first state so that the outside air introducing paths (14, 16) and the outside air discharge path (15) communicate with each other and the discharge passage (P4) and the outside air discharge path (15) are disconnected from each other. In the discharge-side adjusting mechanism (24) in the first state, the third damper (D3) is caused to be in an open state and the fourth damper (D4) is caused to be in a closed state.

As described above, in the circulation operation, by causing the air-supply-side adjusting mechanism (23) and the discharge-side adjusting mechanism (24) to be in the first state, the indoor air circulates in the indoor space (R) via the inside air passage (P1) and the outdoor air circulates in the outdoor space (O) via the outside air passage (P2). Here, in the permeable film unit (30), carbon dioxide in the indoor air is added to the outdoor air via the permeable film (35).

<Ventilation Operation>

For example, when the second condition in which the detected concentration provided by the carbon dioxide concentration sensor (40) is greater than or equal to a predetermined value (for example, 1000 ppm) is met, the indoor air is discharged out of a room to perform a ventilation operation in which outdoor air is supplied into the room. That is, when the second condition is met, the controlling device (50) causes the air-supply-side adjusting mechanism (23) to be in the second state so that the inside air introducing paths (11, 12) and the inside air supply path (13) are disconnected from each other and the air supply passage (P3) and the inside air supply path (13) communicate with each other. In the air-supply-side adjusting mechanism (23) in the second state, the first damper (D1) is caused to be in a closed state, and the second damper (D2) is caused to be in an open state. When the second condition is met, the controlling device (50) causes the discharge-side adjusting mechanism (24) to be in the second state so that the outside air introducing paths (14, 16) and the outside air discharge path (15) are disconnected from each other and the discharge passage (P4) and the outside air discharge path (15) communicate with each other. In the discharge-side adjusting mechanism (24) in the second state, the third damper (D3) is caused to be in a closed state and the fourth damper (D4) is caused to be in an open state.

As described above, in the ventilation operation, by causing the air-supply-side adjusting mechanism (23) and the discharge-side adjusting mechanism (24) to be in the second state, the indoor air is discharged out of the room without passing through the permeable film unit (30) and the outdoor air is supplied into the room without passing through the permeable film unit (30). As a result, since the indoor space (R) is positively ventilated, it is possible to quickly reduce the concentration of carbon dioxide in the indoor air.

For the structure and control of the air-supply-side adjusting mechanism (23) and the discharge-side adjusting mechanism (24) that have been described above, those according to any one of Modifications 1 to 18 above may be used.

For example, in Modification 12 shown in FIG. 15, when the first condition is met, the air-supply-side adjusting mechanism (23) is caused to be in the first state above. As a result, after the indoor air has passed through the permeable film unit (30), the indoor air circulates in a room. When the second condition is met, the air-supply-side adjusting mechanism (3) is caused to be in the second state above. As a result, a ventilation operation in which outdoor air is supplied into the room without passing through the permeable film unit (30) is performed.

For example, in Modification 13 shown in FIG. 16, when the first condition is met, the discharge-side adjusting mechanism (24) is caused to be in the first state above. As a result, after the outdoor air has passed through the permeable film unit (30), the outdoor air circulates out of a room. When the second condition is met, the discharge-side adjusting mechanism (24) is caused to be in the second state above. As a result, a ventilation operation in which indoor air is discharged out of the room without passing through the permeable film unit (30) is performed.

Other Embodiments

In the forms including the embodiment above and each modification, the following structures may be used.

The ventilation system (S) having the form above may be one in which one indoor room (R) is defined as a room to be ventilated and one permeable film unit (30) corresponding to the one indoor space (R) is provided. In addition, one permeable film unit (30) may one for a plurality of indoor spaces (R) to be ventilated.

The permeable film (35) having the form above may be formed of a material that allows a volatile organic compound (VOC) to pass therethrough, or a material that allows both carbon dioxide and a volatile organic compound (VOC) to pass therethrough. In this case, in place of the carbon dioxide concentration sensor (40), a sensor that detects the concentration of a volatile organic compound may be used.

The air supply passage (P3) having the form above may be a passage that is separate from the inside air passage (P1). In this case, as shown in FIG. 16, the air supply passage (P3) includes an inflow end that communicates with an outdoor space (O) and an outflow end that communicates with an indoor space (R).

The discharge passage (P4) having the form above may be a passage that is separate from the outside air passage (P2). In this case, as shown in FIG. 15, the discharge passage (P4) includes an inflow end that communicates with an indoor space (R) and an outflow end that communicates with an outdoor space (O).

In the forms above, a ventilation operation may be switched to a third ventilation operation in addition to the first ventilation operation and the second ventilation operation. In the third ventilation operation, for example, at the same time that the inside air passage (P1) and the air supply passage (P3) are disconnected from each other by the air-supply-side adjusting mechanism (23), the outside air passage (P2) and the discharge passage (P4) are disconnected from each other by the discharge-side adjusting mechanism (24). That is, in the third ventilation operation, outside air is not supplied into the indoor space (R) from the outdoor space (O), and indoor air is not discharged into the outdoor space (O) from the indoor space (R). On the other hand, after the indoor air in the indoor space (R) has flown in the inside air passage (P1) and target gas has been removed by the permeable film (35), the indoor air is sent again into the indoor space (R). After the outdoor air in the outdoor space (O) has flown in the outside air passage (P2) and target gas has been discharged by the permeable film (35), the outdoor air is discharged into the outdoor space (O). In the third ventilation operation, essentially, the indoor air is not discharged into the outdoor space (O), so that it is possible to reliably prevent an increase in air-conditioning load.

In the forms above, the humidifier (61) may be one that directly adds moisture to a surface of the permeable film (35).

INDUSTRIAL APPLICABILITY

The present invention is useful for a ventilation system.

REFERENCE SIGNS LIST

P1 inside air passage
P2 outside air passage
P3 air supply passage
P4 discharge passage
S ventilation system
10 ventilation unit
23 air-supply-side adjusting mechanism
24 discharge-side adjusting mechanism
30 permeable film unit
35 permeable film
61 humidifier
62 dehumidifier
68 desorption region
69 adsorption region
83 first adsorption heat exchanger (humidifier, dehumidifier)
84 second adsorption heat exchanger (dehumidifier, humidifier)

What is claimed is:
1. A ventilation system comprising:
an inside air passage having an inflow end and an outflow end, each of the inflow end and the outflow end of the inside air passage communicating with an indoor space to be ventilated;
at least one permeable film unit including a permeable film, the permeable film allowing a target gas to pass therethrough and allowing the target gas that has passed through the permeable film to be discharged into outdoor air, and the target gas containing at least one of carbon dioxide and a volatile organic compound in indoor air that flows in the inside air passage; and
an air supply passage having
an inflow end communicating with an outdoor space and
an outflow end connected to a downstream side of the permeable in the inside air passage.

2. The ventilation system according to claim 1, further comprising:
an outside air passage having an inflow end and an outflow end, each of the inflow end and the outflow end of the outside air passage communicating with the outdoor space,
in the permeable film being disposed so as to separate the inside air passage and the outside air passage from each other.

3. The ventilation system according to claim 2, further comprising:
a discharge passage having
an inflow end communicating with the indoor space and
an outflow end connected to a downstream side of the permeable film in the outside air passage.

4. The ventilation system according to claim 3, further comprising:
an outside air fan disposed on a downstream side of a connection portion of the discharge passage in the outside air passage.

5. The ventilation system according to claim 3, wherein the outside air passage includes
an outside air introducing path on an upstream side of a connection portion of the discharge passage and
an outside air discharge path on a downstream side of the connection portion of the discharge passage, and
the ventilation system further comprises a discharge-side adjusting mechanism configured to adjust either one of or both of
a flow rate of air flowing in the outside air introducing path and
a flow rate of air flowing in the discharge passage.

6. The ventilation system according to claim 5, further comprising:
a concentration detecting section configured to detect a concentration of a target gas in indoor air in the indoor space; and
a controlling device configured to control the discharge-side adjusting mechanism based on a detected concentration provided by the concentration detecting section.

7. The ventilation system according to claim 1, further comprising:
an inside air fan disposed on a downstream side of a connection portion of the air supply passage in the inside air passage.

8. The ventilation system according to claim 1, wherein the inside air passage includes
an inside air introducing path on an upstream side of a connection portion of the air supply passage, and an inside air supply path on a downstream side of the connection portion of the air supply passage, and wherein the ventilation system farther comprises an air-supply-side adjusting mechanism configured to adjust either one of or both of a flow rate of air flowing in the inside air introducing path and a flow rate of air flowing in the air supply passage.

9. The ventilation system according to claim 8, further comprising:

a concentration detecting section configured to detect a concentration of a target gas in indoor air in the indoor space; and a controlling device configured to control the air-supply-side adjusting mechanism based on a detected concentration provided by the concentration detecting section.

10. The ventilation system according to claim 1, further comprising:

a plurality of permeable film units provided in correspondence with a plurality of indoor spaces to be ventilated.

11. The ventilation system according to claim 1, further comprising:

a humidifier configured to add moisture to the permeable film.

12. The ventilation system according to claim 11, wherein the humidifier is configured to make a humidification capability adjustable.

13. The ventilation system according to claim 11, further comprising:

a dehumidifier configured to dehumidify air flowing on a downstream side of the permeable film.

14. The ventilation system according to claim 13, wherein the humidifier makes use of moisture rem oved by the dehumidifier as humidifying water.

15. A ventilation system comprising:

an outside air passage that has an inflow end and an outflow end, each of the inflow end and the outflow end of the outside air passage communicating with an outdoor space;

at least one permeable film unit including a permeable film, the permeable film allowing a target gas to pass therethrough and allowing the target gas that has passed through the permeable film to be discharged into outdoor air in the outside air passage, and the target gas containing at least one of carbon dioxide and a volatile organic compound in indoor air in an indoor space to be ventilated; and a discharge passage having an inflow end communicating with the indoor space and an outflow end connected to a downstream side of the permeable film in the outside air passage.

16. The ventilation system according to claim 15, further comprising:

an inside air passage having an inflow end and an outflow end, each of the inflow end and the outflow end of the inside air passage communicating with the indoor space to be ventilated, the permeable film being disposed so as to separate the inside air passage and the outside air passage from each other.

* * * * *